(12) United States Patent
Rutherford et al.

(10) Patent No.: US 11,283,605 B2
(45) Date of Patent: Mar. 22, 2022

(54) ELECTRONIC VERIFICATION SYSTEMS AND METHODS

(71) Applicant: ASIGNIO INC., Sedro Woolley, WA (US)

(72) Inventors: Kyle Rutherford, Sedro Woolley, WA (US); Eric Dustrude, Bellingham, WA (US); Benjamin MacKay, Burlington, WA (US); Erik Hodge, Anderson Island, WA (US); Calvin Rutherford, Seattle, WA (US); Kevin Boyd, Seattle, WA (US); Carl Korth, Seattle, WA (US)

(73) Assignee: ASIGNIO INC., Sedro Woolley, WA (US)

( * ) Notice: Subject to any disclaimer, the term of this patent is extended or adjusted under 35 U.S.C. 154(b) by 83 days.

(21) Appl. No.: 16/167,357

(22) Filed: Oct. 22, 2018

(65) Prior Publication Data

US 2019/0123899 A1    Apr. 25, 2019

Related U.S. Application Data

(60) Provisional application No. 62/582,897, filed on Nov. 7, 2017, provisional application No. 62/575,329, filed on Oct. 20, 2017.

(51) Int. Cl.
*H04L 29/06* (2006.01)
*G06Q 20/40* (2012.01)
(Continued)

(52) U.S. Cl.
CPC ....... *H04L 9/0866* (2013.01); *G06Q 20/3223* (2013.01); *G06Q 20/3825* (2013.01);
(Continued)

(58) Field of Classification Search
CPC ..... G06F 21/32; G06F 19/328; H04L 9/0866; H04L 9/3213; H04L 9/3247;
(Continued)

(56) References Cited

U.S. PATENT DOCUMENTS

| 5,347,589 A | 9/1994 | Meeks et al. |
| 8,256,664 B1 | 9/2012 | Balfanz et al. |

(Continued)

FOREIGN PATENT DOCUMENTS

| WO | 2008043090 A1 | 4/2008 |
| WO | 2017087981 A3 | 8/2017 |
| WO | 2018132844 A1 | 7/2018 |

OTHER PUBLICATIONS

International Searching Authority, ISR & Written Opinion, PCT/US2018/056936, dated Jan. 31, 2019, 8 pages.

(Continued)

*Primary Examiner* — Michael Simitoski
*Assistant Examiner* — Andrew Suh
(74) *Attorney, Agent, or Firm* — Michael R. Schacht; Schacht Law Office, Inc.

(57) ABSTRACT

A session user enters session user credential the session user credentials that are compared with stored user credentials to validate the session user credentials. The session user identifies a selected communications method from the at least one communications method presented to the session user, and an authentication message is sent to the session user using the selected communications method. The session user enters a handwritten session signature in response to the authentication message. The handwritten session signature entered by the session user is compared with the reference signature associated with the session user to validate the handwritten session signature. If the handwritten session signature is validated, the session user is authenticated. If the (Continued)

session user has been validated, the session user is allowed to access a set of user information that is associated with the session user and stored on the partner server.

8 Claims, 14 Drawing Sheets

(51) Int. Cl.
- *H04L 9/08* (2006.01)
- *H04L 9/32* (2006.01)
- *G06Q 20/32* (2012.01)
- *G06Q 20/38* (2012.01)

(52) U.S. Cl.
CPC ..... *G06Q 20/40145* (2013.01); *H04L 9/3213* (2013.01); *H04L 9/3226* (2013.01); *H04L 63/0861* (2013.01); *H04L 2209/56* (2013.01)

(58) Field of Classification Search
CPC ............ H04L 63/0861; G06Q 20/3223; G06Q 20/40145; G06Q 20/3825
See application file for complete search history.

(56) References Cited

U.S. PATENT DOCUMENTS

| | | |
|---|---|---|
| 8,601,560 B2 | 12/2013 | Kim et al. |
| 8,850,546 B1 * | 9/2014 | Field ..................... G06F 21/335 726/1 |
| 9,020,525 B2 | 4/2015 | Murphy et al. |
| 9,338,164 B1 | 5/2016 | Liu et al. |
| 9,374,369 B2 | 6/2016 | Mahaffey et al. |
| 9,641,520 B2 | 5/2017 | Neuman et al. |
| 9,686,272 B2 * | 6/2017 | Blinn ................... H04L 63/083 |
| 9,805,182 B1 | 10/2017 | Kayyidavazhiyil et al. |
| 9,813,411 B2 | 11/2017 | Thibadeau et al. |
| 9,836,741 B2 | 12/2017 | Varadarajan et al. |
| 9,866,549 B2 | 1/2018 | Thibadeau et al. |
| 9,887,999 B2 | 2/2018 | Dong et al. |
| 10,083,436 B1 | 9/2018 | Rutherford et al. |
| 2003/0182585 A1 | 9/2003 | Murase et al. |
| 2003/0233557 A1 | 12/2003 | Zimmerman |
| 2009/0210939 A1 | 8/2009 | Xu et al. |
| 2010/0008551 A9 | 1/2010 | Schiller et al. |
| 2010/0100725 A1 * | 4/2010 | Ozzie ..................... G06F 21/43 713/155 |
| 2011/0047608 A1 | 2/2011 | Levenberg |
| 2011/0156867 A1 | 6/2011 | Carrizo et al. |
| 2011/0270751 A1 | 11/2011 | Csinger et al. |
| 2012/0102551 A1 | 4/2012 | Bidare |
| 2012/0330769 A1 | 12/2012 | Arceo |
| 2013/0145446 A1 | 6/2013 | Dorso et al. |
| 2013/0148024 A1 * | 6/2013 | Shin ..................... H04N 21/441 348/552 |
| 2013/0226609 A1 * | 8/2013 | Pourfallah ........... G06Q 20/387 705/2 |
| 2014/0007205 A1 | 1/2014 | Oikonomou |
| 2014/0281946 A1 * | 9/2014 | Avni .................. G06K 9/00194 715/268 |
| 2014/0282961 A1 | 9/2014 | Dorfman et al. |
| 2014/0375573 A1 | 12/2014 | Idzik et al. |
| 2015/0046276 A1 | 2/2015 | Artman et al. |
| 2015/0071505 A1 | 3/2015 | Kim et al. |
| 2015/0089568 A1 * | 3/2015 | Sprague .................. H04L 63/06 726/1 |
| 2015/0237031 A1 | 8/2015 | Neuman et al. |
| 2015/0312252 A1 | 10/2015 | Potonniee |
| 2015/0334108 A1 | 11/2015 | Khalil et al. |
| 2016/0057135 A1 | 2/2016 | Jiang et al. |
| 2016/0191506 A1 | 6/2016 | Wang |
| 2016/0259895 A1 | 9/2016 | Austermann et al. |
| 2016/0314462 A1 | 10/2016 | Hong et al. |
| 2016/0337351 A1 | 11/2016 | Spencer et al. |
| 2017/0060812 A1 | 3/2017 | Williams et al. |
| 2018/0205716 A1 | 7/2018 | Rutherford et al. |
| 2019/0066092 A1 | 2/2019 | Rutherford et al. |

OTHER PUBLICATIONS

USPTO, "Final Office Action, U.S. Appl. No. 15/358,052,", dated Dec. 11, 2018, 14 pages.

International Searching Authority, ISR & Written Opinion, PCT/US18/13916, dated Jun. 21, 2018, 8 pages.

International Searching Authority, ISR & Written Opinion, PCT/US2016/063196, dated May 18, 2017, 7 pages.

USPTO, "Final Office Action, U.S. Appl. No. 14/501,554,", dated Jun. 21, 2017, 16 pages.

USPTO, "Non-Final Office Action, U.S. Appl. No. 14/501,554," dated Jan. 16, 2018, 12 pages.

USPTO, "Non-Final Office Action, U.S. Appl. No. 15/358,052," dated Jul. 5, 2018, 13 pages.

* cited by examiner

ELECTRONIC VERIFICATION SYSTEMS AND METHODS

RELATED APPLICATIONS

This application U.S. patent application Ser. No. 16/167,357 filed Oct. 22, 2018 claims benefit of U.S. Provisional Application Ser. No. 62/575,329 filed Oct. 20, 2017, now expired.

This application U.S. patent application Ser. No. 16/167,357 filed Oct. 22, 2018 also claims benefit of U.S. Provisional Application Ser. No. 62/582,897 filed Nov. 7, 2017, now expired.

The contents of all related applications are incorporated herein by reference.

TECHNICAL FIELD

The present invention relates to systems and methods for verifying users and, more specifically, to verification systems and methods that may be used to verify users when logging into electronic accounts.

BACKGROUND

Merchants often use electronic payment services to accept payments from a customer. Currently, the most common form of electronic payment in the United States uses card with a magnetic stripe (e.g., credit card, debit card, gift card). The magnetic stripe contains data that may be read by swiping the stripe past a magnetic reading head. Magnetic stripe cards may further comprise an RFID tag, transponder device, and/or microchip.

In addition, mobile payment services may be implemented using a smart phone or other portable processing device. A mobile payment service digitizes and replaces the magnetic stripe card. In general, the portable processing device wirelessly communicates with point of sale (POS) systems using a near field communication (NFC) antenna.

Service providers such as banks, insurance companies, hospitals, and merchants typically provide services by allowing a user to access information, including payment information, using an account accessible through an application or website. Before allowing a user to access an online account, the service provider must verity the identity of the user.

The need exists for electronic verification systems and methods that make accessing information online more secure and easy to use.

SUMMARY

The present invention may be embodied as a verification system for verifying a session user comprising an authentication server, a partner server, a partner app/site, an authentication plug-in, and an authentication application. The authentication server stores stored user credentials associated with each of a plurality of users and a reference signature associated with each of the plurality of users. Each reference signature represents a plurality of handwritten calibration signatures entered, using at least one touch sensitive screen, by the user associated each reference signature. The partner server stores user information associated with the plurality of users. The partner app/site forms a portal to the user information stored on the partner server and allows the plurality of users to enter session user credentials. The authentication plug-in presents communications options to the plurality of users and allows the plurality of users to identify at least one selected communications option. The authentication application allows the plurality of users to enter a handwritten session signature. The partner app/site allows the session user to enter session user credentials and sends the session user credentials to the authentication server. The authentication server compares the session user credentials with the stored user credentials to validate the session user credentials. If the session user credentials are validated, the authentication plug-in presents to the session user at least one communications method associated with the session user, allows the session user to identify a selected communications method from the at least one communications method presented to the session user, and sends an authentication message to the session user using the selected communications method. The authentication application allows the session user to enter a handwritten session signature in response to the authentication message and sends the handwritten session signature to the authentication server. The authentication server compares the handwritten session signature entered by the session user with the reference signature associated with the session user to validate the handwritten session signature entered by the session user and, if the handwritten session signature entered by the session user is validated, notifies the partner app/site that the session user has been authenticated. In response to notification that the session user has been validated, the partner app/site allows the session user to access a set of user information that is associated with the session user and stored on the partner server.

The present invention may also be embodied as a method of verifying a session user comprising the following steps. Stored user credentials associated with each of a plurality of users are stored. A reference signature associated with each of the plurality of users is stored. Each reference signature represents a plurality of handwritten calibration signatures entered, using at least one touch sensitive screen, by the user associated each reference signature. User information associated with the plurality of users is stored. A portal to the user information stored on the partner server is provided, where the portal allows the plurality of users to enter session user credentials. The session user is allowed to enter session user credentials. The session user credentials are compared with the stored user credentials to validate the session user credentials. If the session user credentials are validated, at least one communications method associated with the session user is presented to the session user, the session user is allowed to identify a selected communications method from the at least one communications method presented to the session user, and an authentication message is sent to the session user using the selected communications method. In response to receipt by the session user of the authentication message, the session user is allowed to enter a handwritten session signature in response to the authentication message. The handwritten session signature entered by the session user is compared with the reference signature associated with the session user to validate the handwritten session signature entered by the session user. If the handwritten session signature entered by the session user is validated, the session user is allowed to access a set of user information that is associated with the session user and stored on the partner server.

DETAILED DESCRIPTION

The present invention may be embodied in a number of forms, and several examples of the present invention will be discussed separately below.

Electronic Payment Systems and Methods

Figure 1:
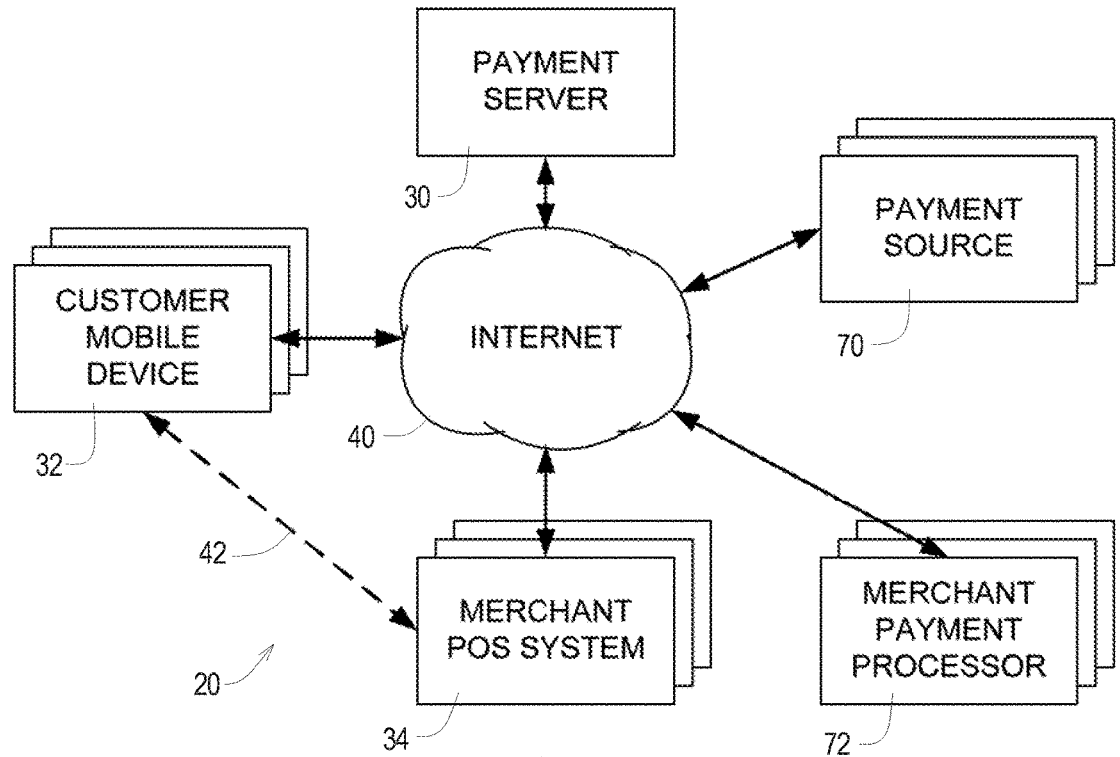
FIG. 1 is a block diagram of an example system for processing electronic payments.

Referring initially to FIG. 1 of the drawing, depicted therein is an example electronic payment processing system 20 constructed in accordance with, and embodying, the principles of the present invention. The example payment processing system 20 comprises a payment server 30, a customer mobile device 32, and a merchant point of sale (POS) system 34. The payment server 30 is a computing system that runs software capable of storing data and performing payment server logic operations as will be discussed below. The customer mobile device 32 is a portable computing device such as a cell-phone, smart phone, tablet, laptop, or the like that runs software capable of storing data and performing customer logic operations as will be discussed below. The merchant POS system 34 is a computing device such as a cell-phone, smart phone, tablet, laptop, cash register, credit-card swipe machine, or the like that runs software capable of storing data and performing merchant logic operations as will be discussed below.

As shown by solid lines in FIG. 1, the payment server 30, customer mobile device 32, and merchant POS system 34 are connected to each other through a first communications system 40 such as the internet. And as shown by even-dashed lines in FIG. 1, the customer mobile device 32 and merchant POS system 34 are directly connected to each other through a second communications system 42 such as a visual system (e.g., Quick Response (QR) code display and sensor), Bluetooth system, and/or Near Field Communication (NFC) system. The communications system 42 is thus typically implemented using a communications channel other than the internet. Typically, the payment processing system 20 will comprise multiple customer mobile devices 32 and multiple merchant POS systems 34.

Figure 2:
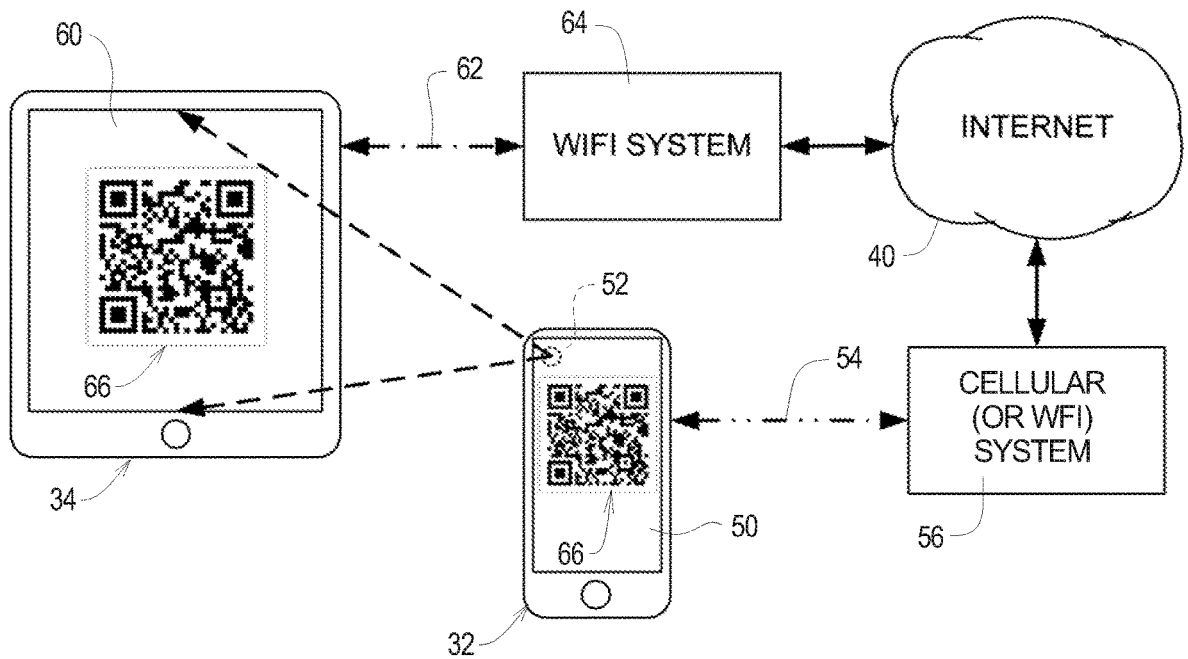
FIG. 2 is a block diagram illustrating one example implementation of a portion of the example electronic payment processing system of FIG. 1.

FIG. 2 illustrates that the example customer mobile device 32 may be, for example, an iPhone comprising an input device such as a touch sensitive screen 50 and a camera 52. The iPhone forming the example customer mobile device 32 is operatively connected to a cellular communications system 54 that allows the customer mobile device 32 to transmit data to and received data from a cellular system 56. The cellular system 56 is in turn connected to the first communications system 40. FIG. 2 also illustrates that the example merchant POS system 34 may be, for example, an iPad comprising a display device 60. The iPad forming the example merchant POS device 32 comprises a WiFi communications system 62 that allows the merchant POS device 32 to transmit data to and received data from a WiFi system 64. The WiFi system 64 is also connected to the first communications system 40.

More specifically, FIG. 2 shows that the example display device 60 of the iPad forming the merchant POS device 34 is capable of displaying a QR code 66, and the camera 52 of the iPhone forming the example customer mobile device 32 is capable of generating image data representative of the QR code 66 such that the QR code 66 may be displayed by the display device 60. The QR image data may also be used to display the QR code 66 on the touch sensitive screen 50 and/or to transmit the QR code 66 to the first communications system 40 through the cellular communications system 54.

Referring now back to FIG. 1, it can be seen that the example payment processing system 20 may further comprise a payment source 70 and a merchant payment processor 72 for facilitating the transfer of funds from a payer associated with the customer mobile device 32 and a payee associated with the merchant POS system 34. The example payment processing system 20 will typically comprise multiple payment sources 70 and multiple merchant payment processors 72. The payment sources 70 are typically associated with e-commerce companies such as banks, lending institutions, and/or credit card companies authorized to make payment on behalf of the payer associated with the customer mobile device 32. The merchant payment processors 72 are typically e-commerce companies such as banks, credit card services companies, and/or payment processing companies (e.g., PayPal) authorized to receive payment on behalf of the payee associated with the merchant POS system 34. The customer mobile devices 32 are thus associated with one or more of the payment sources 70. Similarly, the merchant POS systems 34 are associated with one or more of the merchant payment processors 72. It is possible that the payment source 70 and the merchant payment processor 72 are the same entity for a given transaction.

II. First Example Electronic Payment Method

Figure 3:
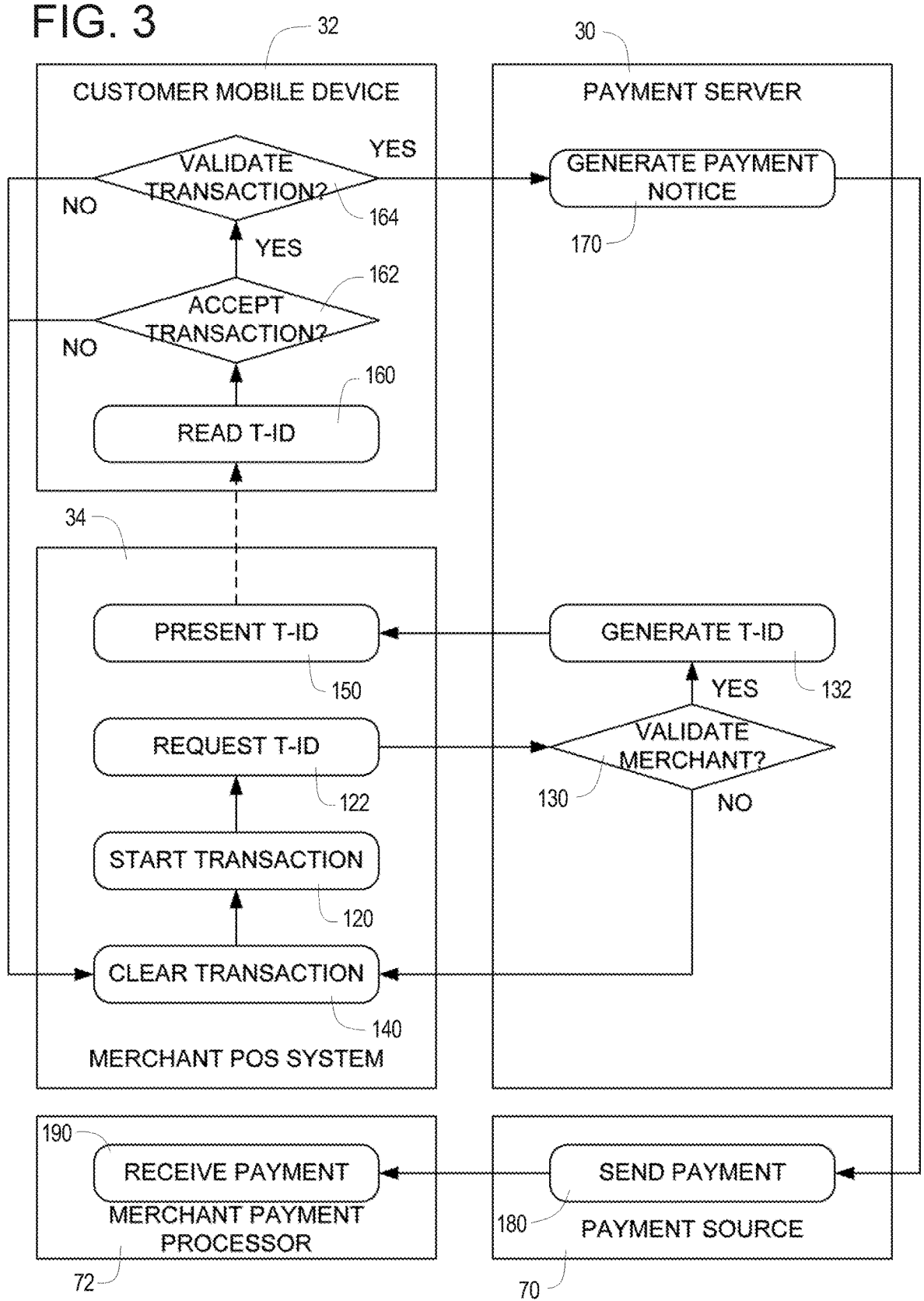
FIG. 3 is a flow chart illustrating the interactions among the components of the example electronic payment processing system of FIG. 1 when performing a first example electronic payment processing method.

Referring now to FIG. 3 of the drawing, depicted therein is a first example electronic payment method of the present invention. The first example electronic payment method depicted in FIG. 3 is performed by software running on the payment server 30, the customer mobile devices 32, the merchant POS system 34, the payment sources 70, and the merchant payment processors 72.

In the first example electronic payment method, the process is initiated at a Start Transaction step 120 performed by the merchant POS system 34. After the process is initiated at step 120, the merchant POS system 34 generates transaction identification (T-ID) request at a Request T-ID step 122. The T-ID request is transmitted to the payment server 30, which determines whether the T-ID request comes from a valid merchant at Validate Merchant step 130. The first communication system 40 is used to communicate data representing the T-ID request from the merchant POS system 34 to the payment server 30. If the merchant is validated at step 130, the payment server 30 generates a T-ID at a Generate T-ID step 132. If the merchant is not validated at step 130, the process proceeds to a Clear Transaction step 140 and the process is terminated.

The T-ID generated by the payment server 30 is transmitted back to the merchant POS system 34 after the Generate T-ID step 132. The first communication system 40 is used to communicate data representing the T-ID from the payment server 30 to the merchant POS system 34.

At a Present T-ID step 150, the merchant POS system presents the T-ID to the customer mobile device 32 such that T-ID is transmitted in some fashion directly from the merchant POS system 34 to the customer mobile device 32. The second communications system 42 is used to communicate the data representing the T-ID from the merchant POS system 34 to the customer mobile device 32.

After the customer mobile device 32 has read the T-ID at a Read T-ID step 160, the customer mobile device 32 allows the payer operating the customer mobile device 32 to decide whether to accept the transaction at an Accept Transaction step 162. If the payer declines to accept the transaction at step 162, the process returns to the Clear Transaction step 140.

If the payer accepts the transaction at step 162, the customer mobile device 32 requires the payer to validate the transaction at a Validate Transaction step 164. If the payer does not successfully validate the transaction at step 164, the process returns to the Clear Transaction step 140.

If the payer successfully validates the transaction at step 164, the customer mobile device 32 sends confirmation data to the payment server 30. The first communication system 40 is used to communicate the confirmation data from the customer mobile device 32 to the payment server 30.

When the payment server 30 receives the confirmation data, the payment server 30 generates payment initiation data at a Generate Payment Notice step 170, and the payment server 30 sends a payment initiation notice containing the payment initiation data to the payment source 70. The first communication system 40 is used to communicate the payment initiation data from the payment server 30 to the payment source 70.

When the payment source 70 receives the payment notice, the payment source 70 generates payment completion data at a Send Payment step 180. The payment source 70 sends a payment completion notice containing the payment completion data to the merchant payment processor 72. The first communication system 40 is used to communicate the payment completion data from the payment source 70 to the merchant payment processor 72. When the merchant payment processor 72 receives the payment completion notice, the funds are withdrawn from the payer's account and then deposited in the payee's account at a Receive Payment step 190.

III. Second Example Electronic Payment Method

Figure 4:
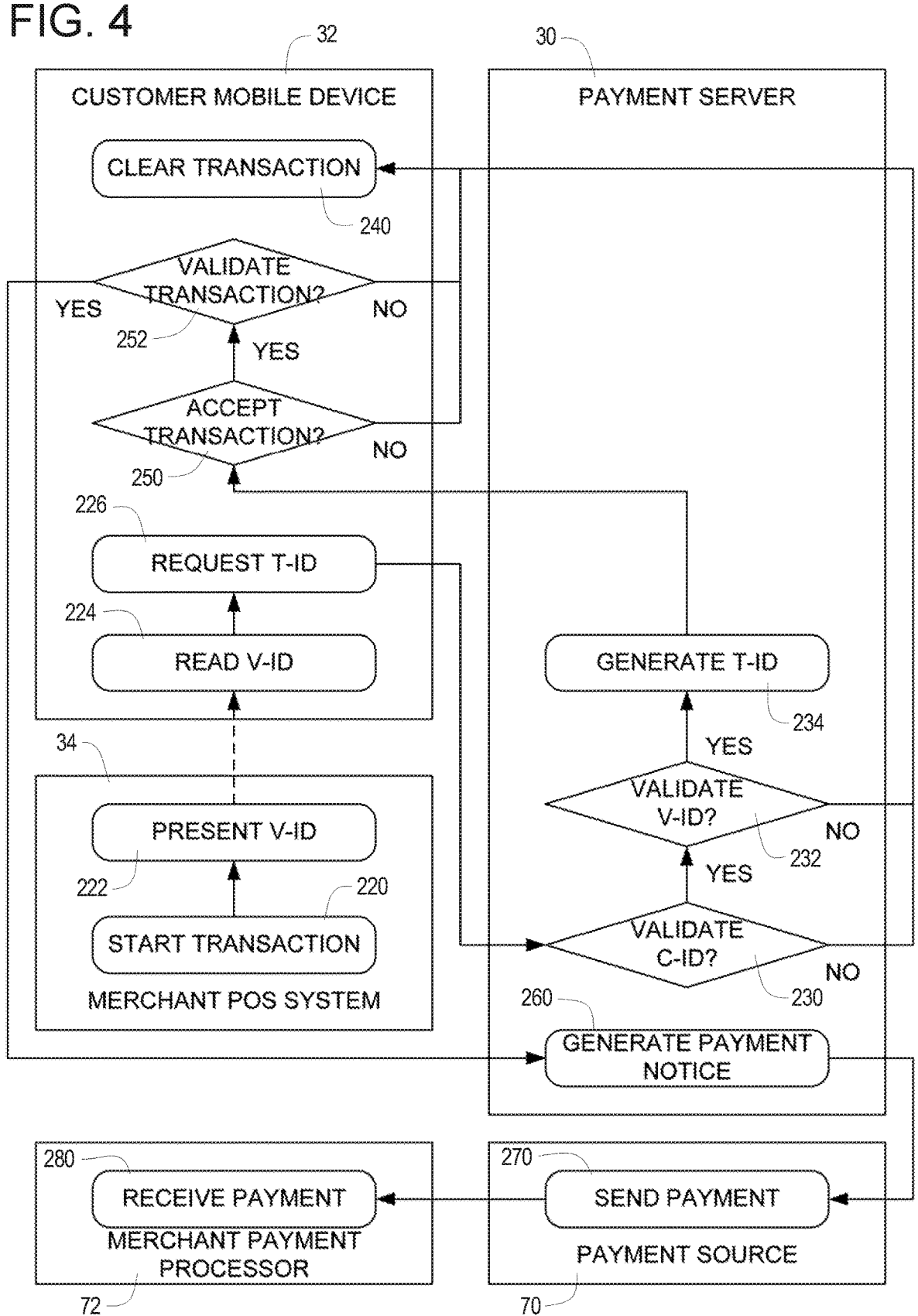
FIG. 4 is a flow chart illustrating the interactions among the components of the example electronic payment processing system of FIG. 1 when performing a second example electronic payment processing method.

Referring now to FIG. 4 of the drawing, depicted therein is a second example electronic payment method of the present invention. The second example electronic payment method depicted in FIG. 4 is performed by software running on the payment server 30, the customer mobile devices 32, the merchant POS system 34, the payment sources 70, and the merchant payment processors 72.

In the second example electronic payment method, the process is initiated at a Start Transaction step 220 performed by the merchant POS system 34. However, unlike with the first example electronic payment method, the merchant POS system 34 does not generate a T-ID request in the second example electronic payment method. Instead, the customer mobile device 32 generates the T-ID request after obtaining the V-ID (vendor identification) from the merchant POS system 34.

In particular, in the second example electronic payment method, the merchant POS system 34 presents the V-ID to the customer mobile device 32 at a Present V-ID step 222. Using the second communication system 42, the customer mobile device 32 reads the V-ID at a Read V-ID step 224. After reading the V-ID at step 224, the customer mobile device 32 generates a T-ID request at step 226.

The customer mobile device 32 then transmits the T-ID request to the payment server 30 using the first communication system 40. The T-ID request contains the V-ID obtained from the merchant POS system 34, the C-ID stored in the customer mobile device 32, and details of the proposed transaction. The payment server 30 determines whether the T-ID request comes from a valid customer and merchant by performing a Validate C-ID step 230 and a Validate V-ID step 232. If the merchant and customer are validated at steps 230 and 232, the payment server 30 generates a T-ID at a Generate T-ID step 234. If either the merchant or the customer is not validated at steps 230 and 232, the process proceeds to a Clear Transaction step 240, and the process is terminated.

The T-ID generated by the payment server 30 is then transmitted back to the merchant POS system 34 after the Generate T-ID step 234. The first communication system 40 is used to communicate data representing the T-ID from the payment server 30 to the merchant POS system 34.

After the customer mobile device 32 has obtained the T-ID, the customer mobile device 32 allows the payer operating the customer mobile device 32 to decide whether to accept the transaction at an Accept Transaction step 250. If the payer declines to accept the transaction at step 250, the process returns to the Clear Transaction step 240.

If the payer accepts the transaction at step 250, the customer mobile device 32 requires the payer to validate the transaction at a Validate Transaction step 252. If the payer does not successfully validate the transaction at step 252, the process returns to the Clear Transaction step 240.

If the payer successfully validates the transaction at step 252, the customer mobile device 32 sends confirmation data to the payment server 30. The first communication system 40 is used to communicate the confirmation data from the customer mobile device 32 to the payment server 30.

When the payment server 30 receives the confirmation data, the payment server 30 generates payment initiation data at a Payment Notice step 260, and the payment server 30 sends a payment initiation notice containing the payment initiation data to the payment source 70. The first communication system 40 is used to communicate the payment initiation data from the payment server 30 to the payment source 70.

When the payment source 70 receives the payment notice, the payment source 70 generates payment completion data at a Send Payment step 270. The payment source 70 sends a payment completion notice containing the payment completion data to the merchant payment processor 72. The first communication system 40 is used to communicate the payment completion data from the payment source 70 to the merchant payment processor 72. When the merchant payment processor 72 receives the payment completion notice, the funds are withdrawn from the payer's account and then deposited in the payee's account at a Receive Payment step 280.

IV. Example Validate Transaction Step

Figure 5:
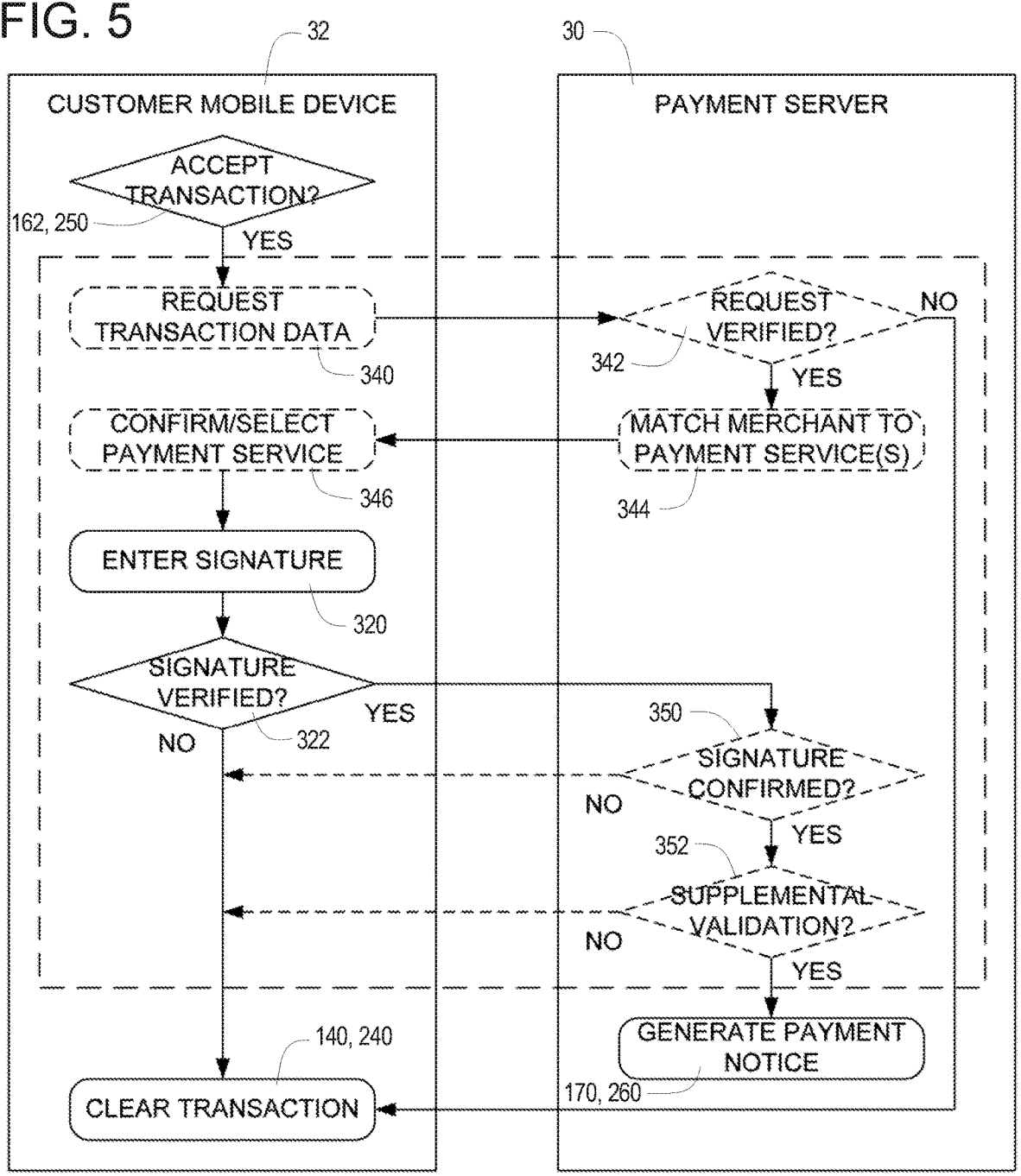
FIG. 5 is a flow chart illustrating the interactions among certain of the components of the example electronic payment processing system of FIG. 1 when performing a step of validating a transaction in either of the first or second example electronic payment processing methods.

Turning now to FIG. 5 of the drawing, depicted therein is an example process for performing a Validate Transaction step that may be implemented by an electronic payment method of the present invention, such as either of the first and second example electronic payment methods described above.

After an Accept Transaction step, such as either of the steps 162 or 250 as depicted in FIGS. 3 and 4, a user of the customer mobile device enters one or more signatures at an Enter Signature step 320. The entered signature(s) is verified at a Verify Signature step 322. If the signature is verified at step 322, the process proceeds to a Generate Payment Notice step, such as either of the steps 170 or 260 as depicted in FIGS. 3 and 4. If the signature is not verified at step 322, the process proceeds to a Clear Transaction step, such as either of the steps 140 and 240 as depicted in FIGS. 3 and 4.

In the context of the present invention, the term "signature" refers to a unique identifier for a particular individual. The customer mobile device 32 is provided with a user input device or sensor that facilitates the detection of the unique identifier. One commonly accepted example of such a unique identifier is a handwritten signature. As shown for example in FIG. 6, the customer mobile device 32 may be provided with a touch sensitive screen 50 to allow the handwritten signature 330 (solid lines) to be entered and compared with a reference signature 332 (broken lines) as will be explained in further detail below.

Figure 6:
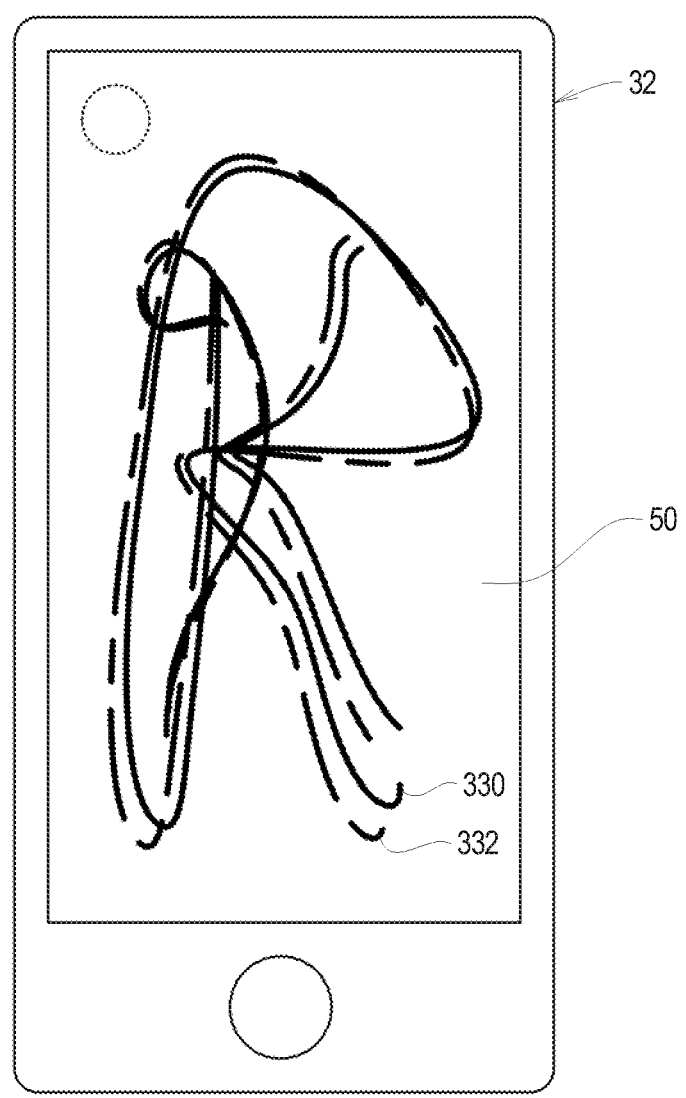
FIG. 6 illustrates the entry of a signature into a customer mobile device using a touch screen thereof as part of the step of validating a transaction as depicted in FIG. 5.

In particular, the reference signature 332 is depicted in FIG. 6 for illustrative purposes only and would, in fact, not be displayed by the customer mobile device 32. The handwritten signature 330 will be displayed as formed by the individual authorizing the transaction using the customer mobile device 32. The handwritten signature 330 will be compared in software with the reference signature 332, and the handwritten signature 330 will be verified only when it deviates no more than a predetermined amount from the reference signature 332. As can be seen in FIG. 6, the handwritten signature 330 substantially matches the reference signature 332 and would likely be verified.

Alternative unique identifiers include biometric identifiers such as fingerprint data and retina data. In either case, specialized sensors and processing may be used to generate data associated with an individual's fingerprint or retina that may be used verify that the user of the customer mobile device 32 is the particular individual authorized to make payment with a particular payment source.

FIG. 5 further illustrates that the example Validate Transaction process may include a number of optional steps as indicated by broken lines.

As one option, example Accept Transaction step may allow the customer to confirm or select one or more payment services associated with the merchant. In particular, the customer mobile device 32 may generate a Transaction Data request at a Request Transaction Data step 340. The Transaction Data request is verified by the payment server 30 at a Request Verified step 342. If the Transaction Data request is not verified at step 342, the process proceeds to the Clear Transaction step, and the process terminates. If the Transaction Data request is verified at step 342, the merchant is matched to associated payment services at step 344. Data associated with matching payment services is then transmitted to the customer mobile device 32. The customer may then confirm or select a payment service at a Confirm/Select Payment Source step 346. At that point, the example Validate Transaction step moves to the Enter Signature step 320.

As another option, the Accept Transaction step may include additional verification performed by the payment server 30. In particular, after the customer mobile device 32 verifies the signature at the Confirm Signature step 322, the payment server 30 can perform one or both of a Signature Confirmed step 350 and a Supplemental Validation step 352. If the verification of the signature is not confirmed at the Signature Confirmed step 350, the process proceeds to the Clear Transaction step. The process also proceeds to the Clear Transaction step if the supplemental validation fails at the Supplemental Validation step 352. If the verification of the signature is confirmed at the Signature Confirmed step 350 and the supplemental validation does not fail at the Supplemental Validation step 352, the process proceeds to the Generate Payment Notice step.

The supplemental validation performed by the Supplemental Validation step 352 may be any additional information that may be used to confirm that the individual in possession of the customer mobile device is authorized to make payment using a particular payment source. For example, the supplemental validation may question a transaction if the merchant POS system is located in a geographical area not typically frequented by the authorized individual. As another example, supplemental validation may take the form of having the operator of the merchant POS system 34 to check the identification papers of the individual in possession of the customer mobile device 32. As yet another example, the supplemental validation may take the form of additional biometric identification beyond that performed in the Signature Verified step 322.

V. Example Optional Steps

Figure 7:
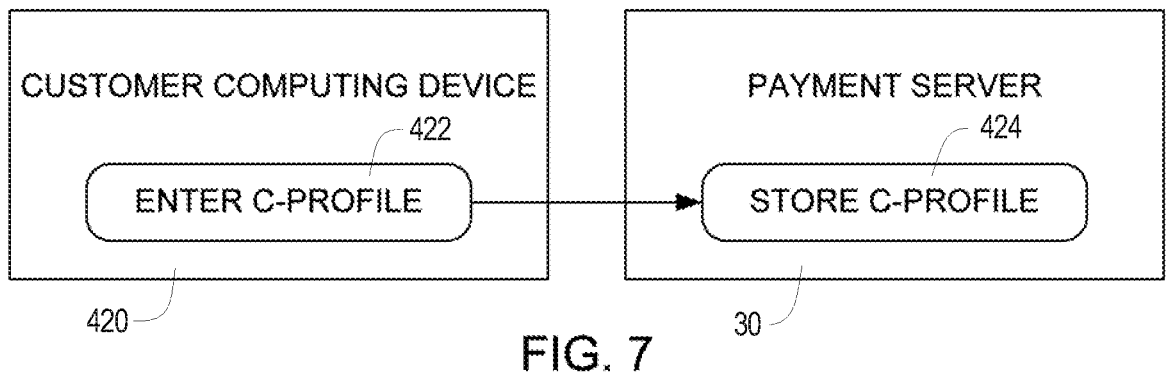
FIG. 7 is a flow chart illustrating the interactions among certain of the components of the example electronic payment processing system of FIG. 1 when performing an optional step of creating a customer profile.

FIG. 7 illustrates the process of creating a customer profile (C-Profile) on the payment server 30. The authorized individual will use the customer mobile device 32 or any other computing device such as a personal computer 420 capable of communicating with the payment server 30 to create a C-Profile by entering data at a step 422 using the customer computing device 420. The payment server 30 stores the data as the C-Profile at a step 424. The C-Profile allows the payment server 30 to establish a connection with the one or more of the payment sources 70 associated with the authorized user creating the C-Profile. The C-Profile will typically be established in advance of performing an electronic payment method of the present invention.

Figure 8:
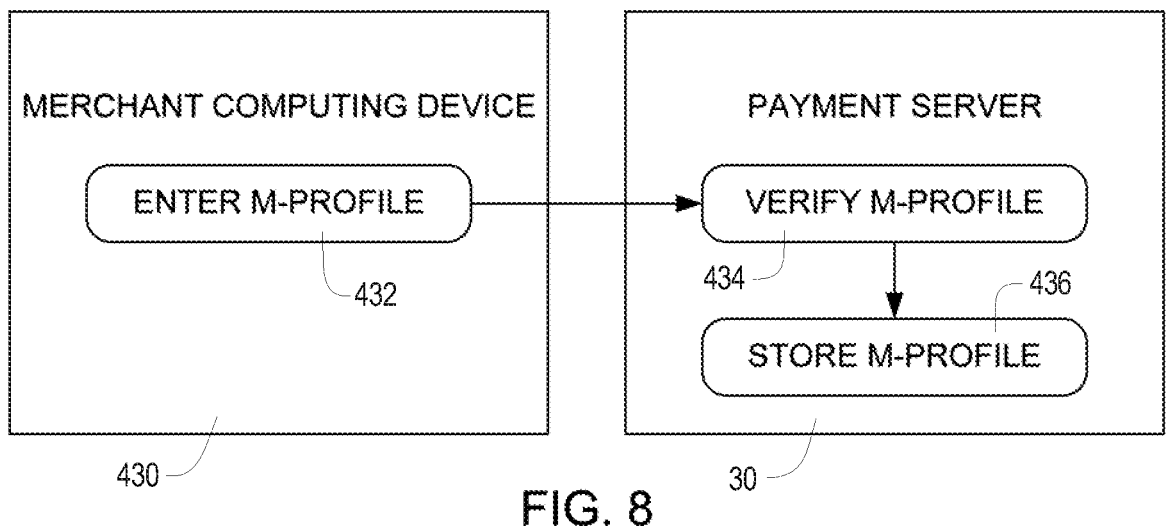
FIG. 8 is a flow chart illustrating the interactions among certain of the components of the example electronic payment processing system of FIG. 1 when performing an optional step of creating a merchant profile.

FIG. 8 illustrates the process of creating a merchant profile (M-Profile). The merchant will use a computing device such as a workstation 430 to enter data to create the M-Profile at a step 432. The payment server 30 verifies the M-Profile at a step 434 and stores the M-Profile at a step 436.

Figure 9:
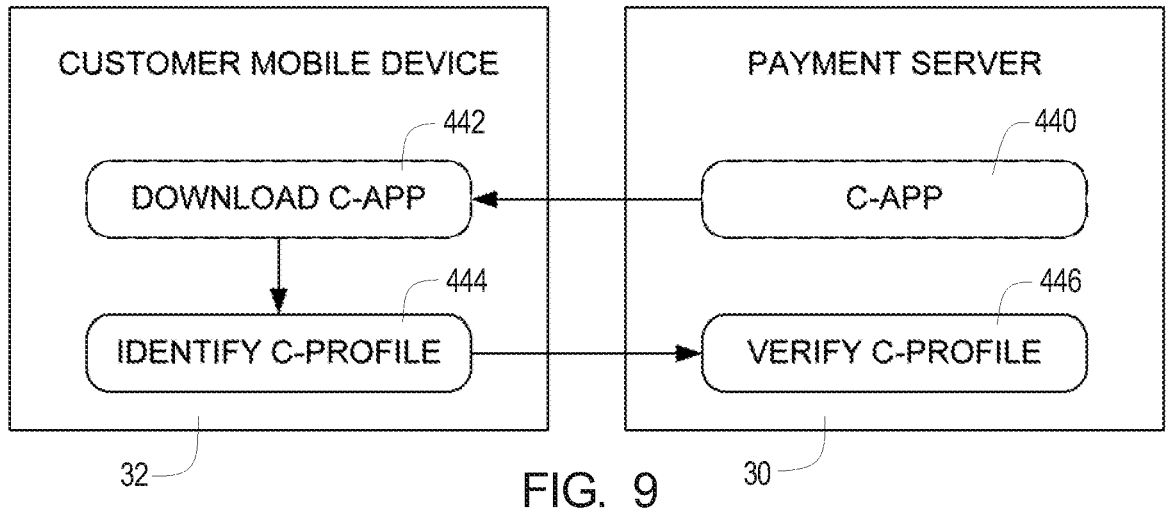
FIG. 9 is a flow chart illustrating the interactions among certain of the components of the example electronic payment processing system of FIG. 1 when performing an optional step of a downloading a customer application.

FIG. 9 illustrates the process of downloading a customer mobile application (C-App) 440 from the payment server 30 to the customer mobile device 32. The user of the mobile device downloads the C-App 440 at a step 442. The user then identifies a C-Profile using the C-App 440 at a step 444, and the payment server 30 verifies the C-Profile identified at step 444 at a step 446.

Figure 10:
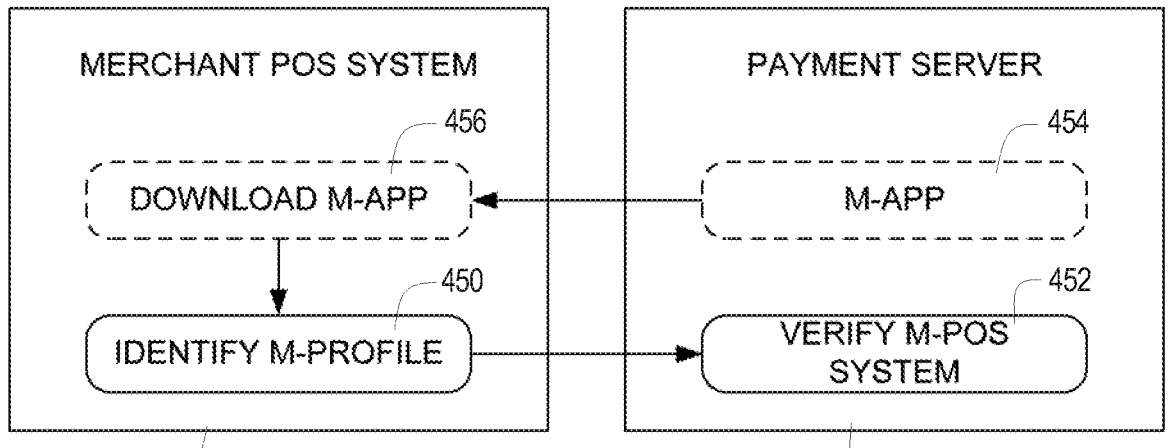
FIG. 10 is a flow chart illustrating the interactions among certain of the components of the example electronic payment processing system of FIG. 1 when performing an optional step of a downloading a merchant application.

FIG. 10 illustrates the process of associating a particular M-Profile with a particular merchant POS system. The merchant uses the merchant POS system 34 to identify the appropriate M-Profile at a step 450. The identified M-Profile is then transmitted to the payment server 30 for verification at a step 452. Optionally, the merchant can, if necessary, download a merchant mobile application (M-App) 454 at a step 456 prior to identifying the appropriate M-Profile at step 450.

FIGS. 11 and 12A-12D illustrate the process of preparing the customer mobile device 32 to authenticate the identity of the user by creating a reference signature such as the reference signature 332 described above. The process depicted in FIG. 11 assumes that the customer mobile device 32 is loaded with the C-App and that the user has set up a C-Profile. To create the reference signature 332, the user first uses the customer mobile device 32 to identify the appropriate C-Profile at a step 460. The payment server 30 verifies the C-Profile at step 462.

Figure 12A:
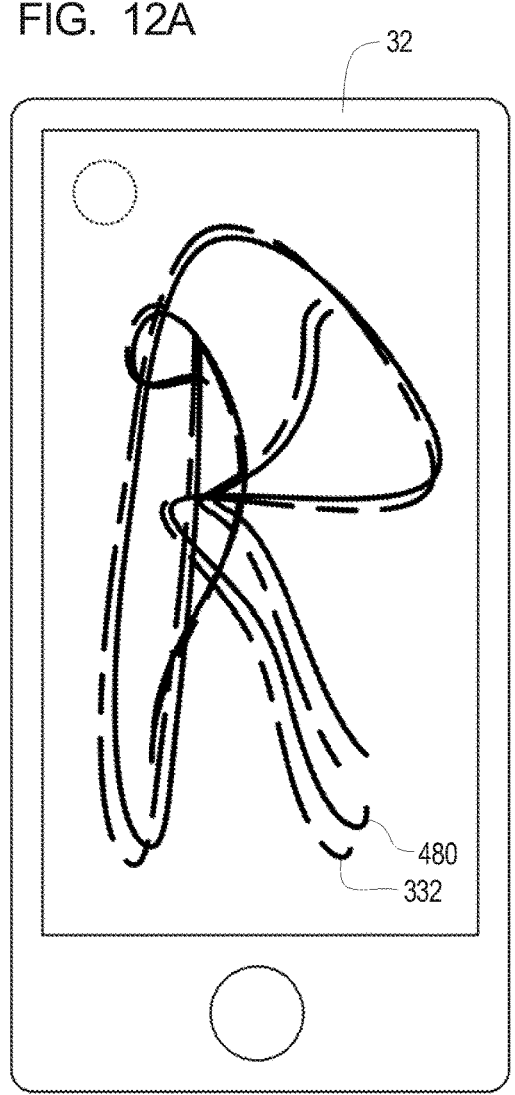
FIGS. 12A-12D illustrating the process of establishing a reference signature for use in the example validation step depicted in FIG. 11.

At a step 470, the user enters a first (calibration) signature using the customer mobile device 32 as generally described above. FIG. 12A shows both the first signature as represented by solid lines 480 and also represents the reference signature 332 using dotted lines. Again, the dotted lines are not actually displayed by the customer mobile device 32 but are depicted in FIG. 12A to provide a reference point to illustrate the ultimate creation of the reference signature 332. The customer mobile device data associated with the first signature 480 is stored by the customer mobile device 32.

Figure 12B:
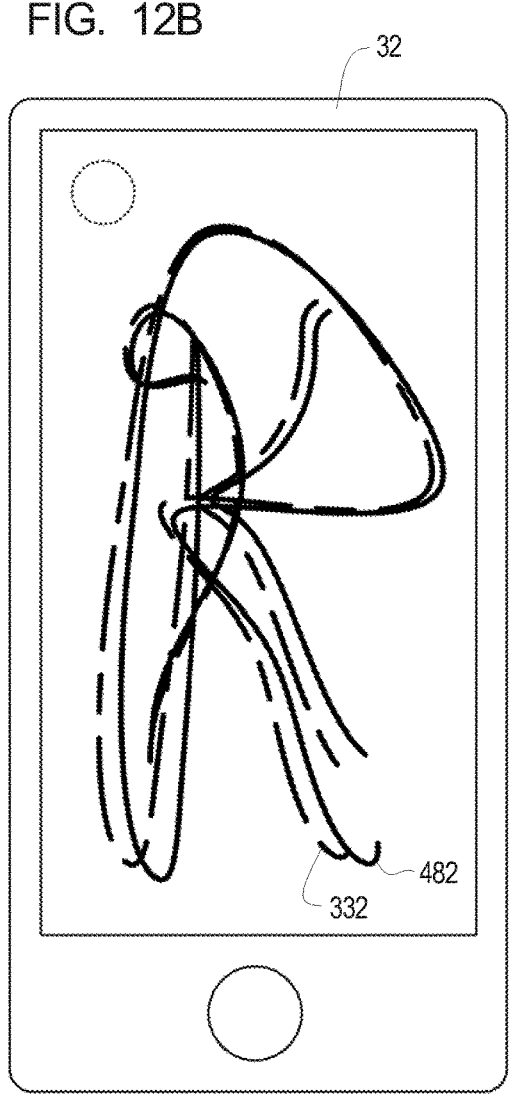

At a step 472, the user enters a second (calibration) signature using the customer mobile device 32. FIG. 12B shows both the second signature as represented by solid lines 482 and also represents the reference signature 332 using dotted lines. Again, the dotted lines are not actually displayed by the customer mobile device 32 but are depicted in FIG. 12B to provide a reference point to illustrate the ultimate creation of the reference signature 332. The customer mobile device data associated with the second signature 482 is stored by the customer mobile device 32. Variations between the first and second signatures 480 and 482 are used to generate a first iteration of the reference signature 332 at a step 474.

Figure 12C:
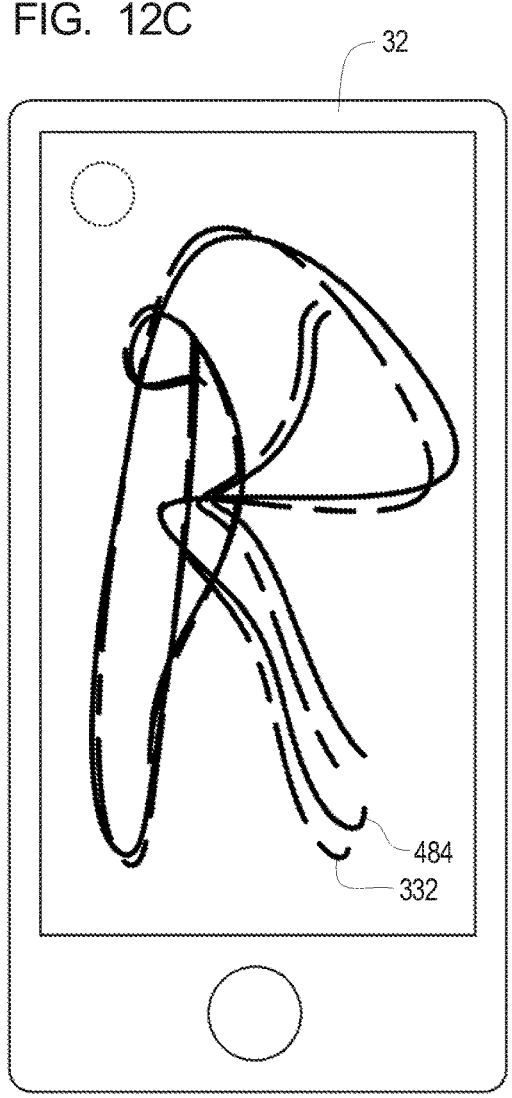

The process then returns to step 472, at which point the user enters a third (calibration) signature using the customer mobile device 32. FIG. 12C shows both the third signature as represented by solid lines 484 and also represents the reference signature 332 using dotted lines. Again, the dotted lines are not actually displayed by the customer mobile device 32 but are depicted in FIG. 12C to provide a reference point to illustrate the ultimate creation of the reference signature 332. The customer mobile device data associated with the third signature 484 is stored by the customer mobile device 32. Variations between the first, second, and third signatures 480, 482, and 484 are used to generate a first iteration of the reference signature 332 at the step 474.

Figure 11:
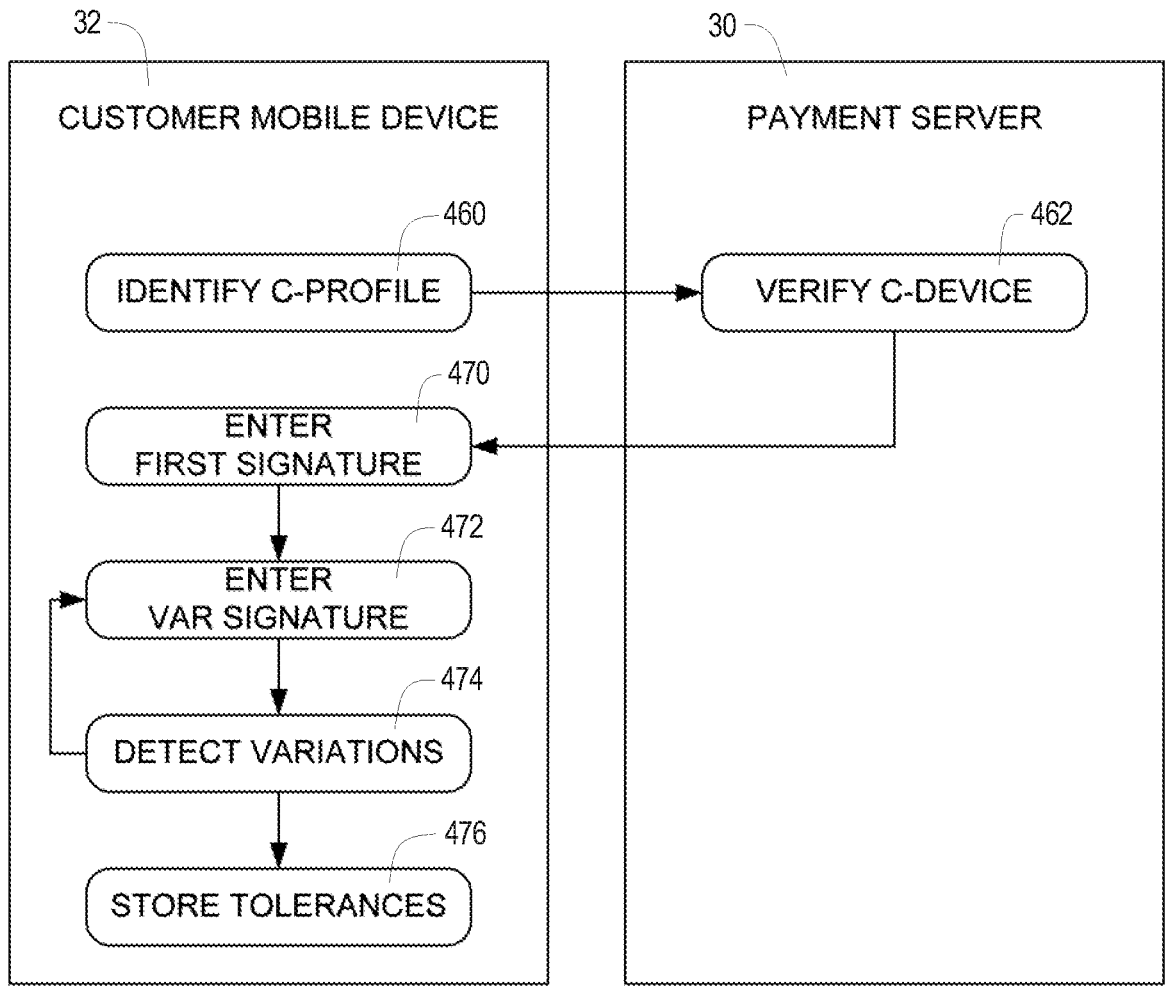
FIG. 11 is a flow chart illustrating the interactions among certain of the components of the example electronic payment processing system of FIG. 1 when performing an optional step of verifying the customer's signature when performing the step of validating a transaction in either of the first or second example electronic payment processing methods.
Figure 12D:
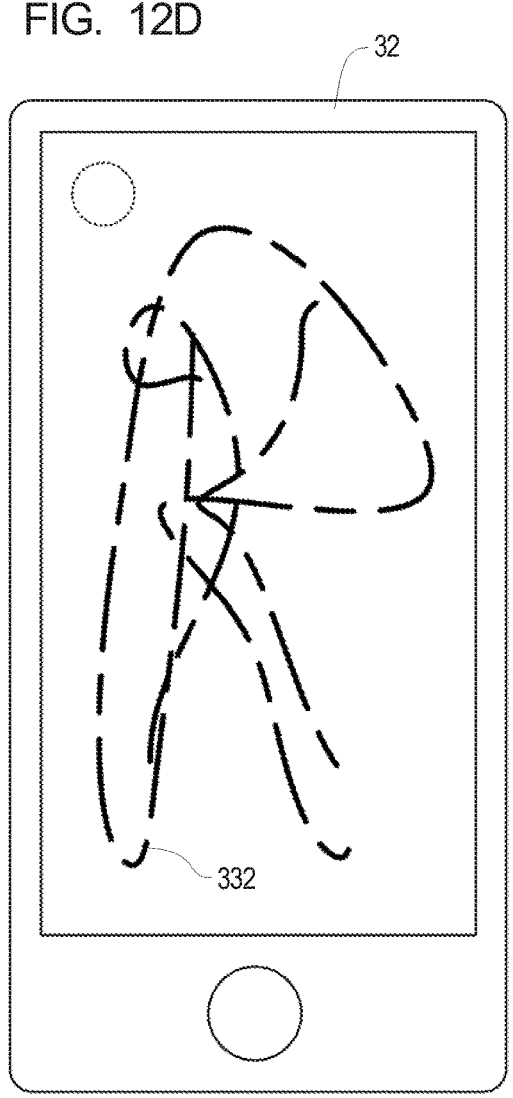

After enough signature entries to create a reference signature representative of tolerances among all of the various signatures 480, 482, and 484, plus any additional signatures entered as may be necessary to reduce the likelihood of error during the validation process, the reference signature 332 may be represented by a reference signature as shown by FIG. 12D, and FIG. 11 shows that acceptable variances from the reference signature are stored as tolerances at step 476. The reference signature 332 in conjunction with the variations as stored at step 476 thus incorporates variation data indicative of normal variations of actual signatures from the reference signature that are acceptable when determining whether a particular signature is valid.

VI. Variations on Electronic Payment Method

As shown in and described in connection with FIGS. 13-15, the principles of the present invention may also be embodied in an example payment processing system 520 in which the combination of a "static" code (one that is not dynamically generated for each transaction) and a delivered PIN or Key Code may be used to identify a particular transaction. The example payment processing system 520 comprises a payment server 530, a customer mobile device 532, and a merchant point of sale (POS) system 534. The payment server 530 is a computing system that runs software capable of storing data and performing payment server logic operations as will be discussed below. The customer mobile device 532 is a portable computing device such as a cell-phone, smart phone, tablet, laptop, or the like that runs software capable of storing data and performing customer logic operations as will be discussed below. The merchant POS system 534 is a computing device such as a cell-phone, smart phone, tablet, laptop, cash register, credit-card swipe machine, or the like that runs software capable of storing data and performing merchant logic operations as will be discussed below.

Figure 13:
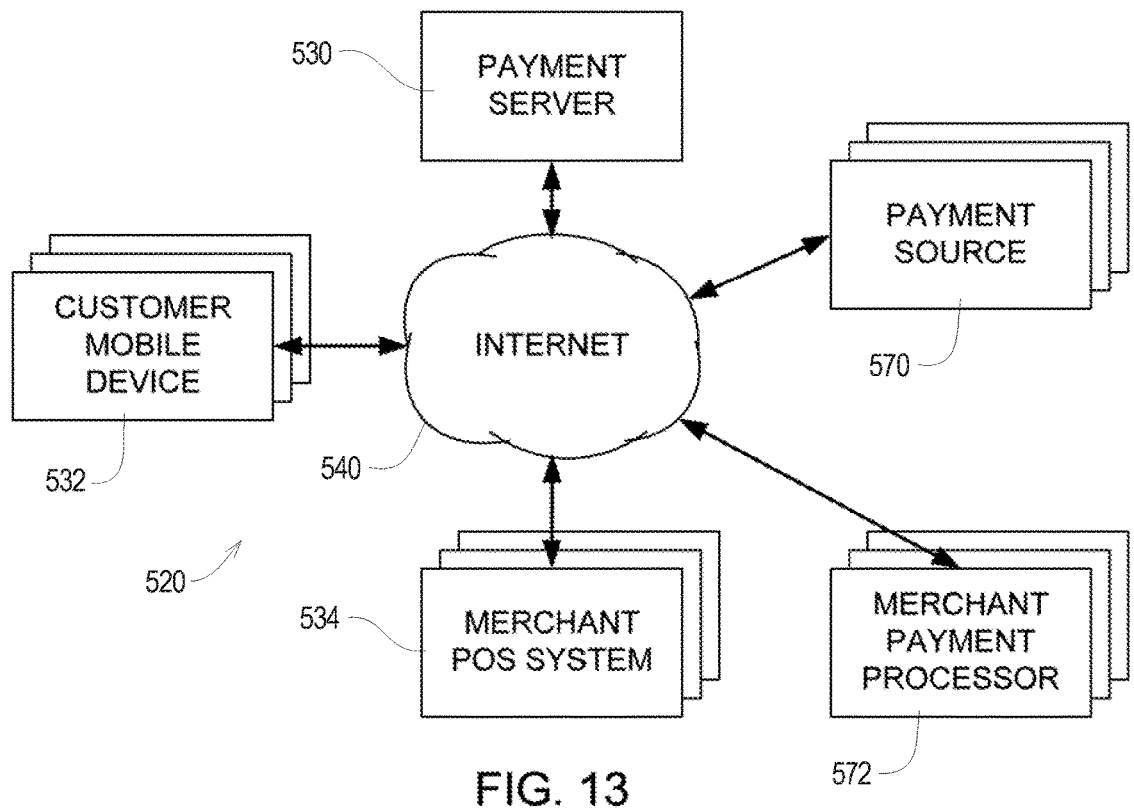
FIG. 13 is a block diagram of another example system for processing electronic payments.

As shown by solid lines in FIG. 13, the payment server 530, customer mobile device 532, and merchant POS system 534 are connected to each other through a first communications system 540 such as the internet. Typically, the payment processing system 520 will comprise multiple customer mobile devices 532 and multiple merchant POS systems 534. FIG. 13 also shows that, in the example payment processing system 520, the example customer mobile device 532 and merchant POS system 534 are not in direct communication.

Figure 14:
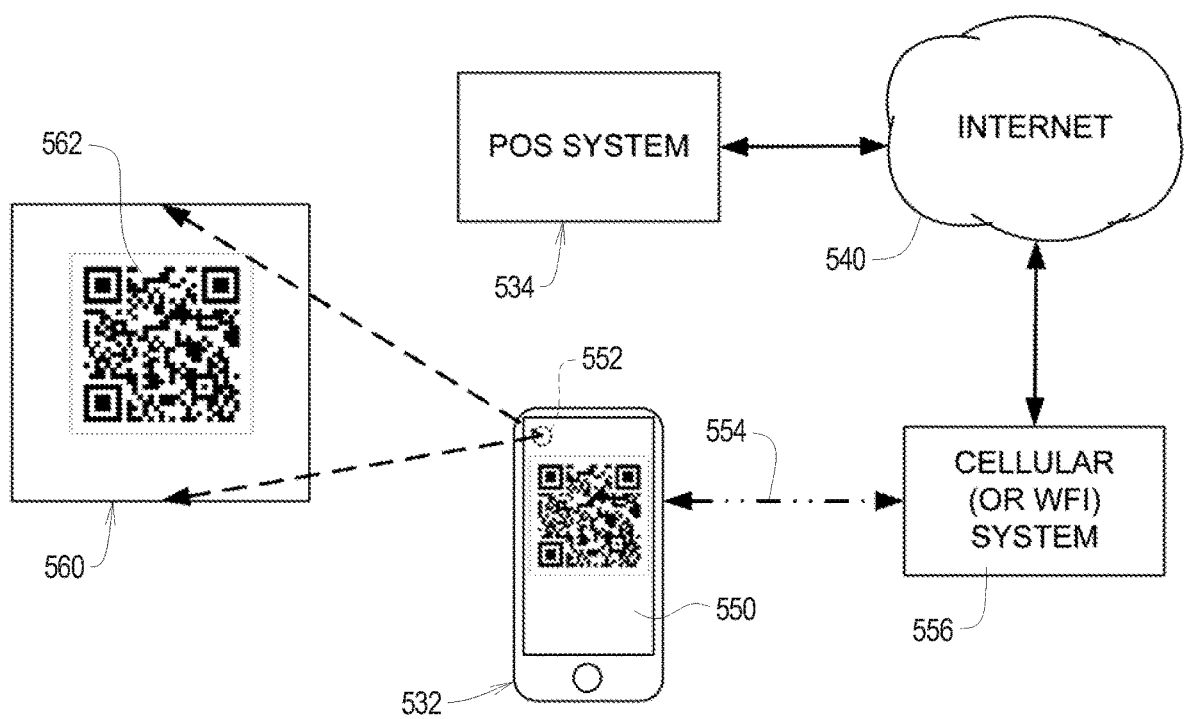
FIG. 14 is a block diagram illustrating one example implementation of a portion of the example electronic payment processing system of FIG. 13.

FIG. 14 illustrates that the example customer mobile device 532 may be, for example, an iPhone comprising an input device such as a touch sensitive screen 550 and a camera 552. The iPhone forming the example customer mobile device 532 is operatively connected to a cellular communications system 554 that allows the customer mobile device 532 to transmit data to and received data from a cellular system 556. The cellular system 556 is in turn connected to the first communications system 540.

FIG. 14 also illustrates that a display device 560 is associated with the example merchant POS system 534. The example merchant POS device 534 is operatively connected to the first communications system 540. FIG. 14 also shows that the example display device 560 associated with the example merchant POS device 534 is capable of displaying a "static" code 562. The camera 552 of the iPhone forming the example customer mobile device 532 is capable of generating image data such that the "static" code 562 may be displayed by the display device 560. The iPhone forming the example customer mobile device 532 is also capable of generating "static" code data representative of the "static" code 562 based on the image data generated by the camera 552.

Referring now back to FIG. 13, it can be seen that the example payment processing system 520 may further comprise a payment source 570 and a merchant payment processor 572 for facilitating the transfer of funds from a payer associated with the customer mobile device 532 and a payee associated with the merchant POS system 534. The example payment processing system 520 will typically comprise multiple payment sources 570 and multiple merchant payment processors 572. The payment sources 570 are typically associated with e-commerce companies such as banks, lending institutions, and/or credit card companies authorized to make payment on behalf of the payer associated with the customer mobile device 532. The merchant payment processors 572 are typically e-commerce companies such as banks, credit card services companies, and/or payment processing companies (e.g., PayPal) authorized to receive payment on behalf of the payee associated with the merchant POS system 534. The customer mobile devices 532 are thus associated with one or more of the payment sources 570. Similarly, the merchant POS systems 534 are associated with one or more of the merchant payment processors 572. It is possible that the payment source 570 and the merchant payment processor 572 are the same entity for a given transaction.

In the example described above, the example display device 560 may be a physical, printed sign on which a "static" QR code 562 is printed. Alternatively, the example display device 560 may be an electronic display device such as a display screen to allow the "static" QR code 562 to be changed from time to time as necessary. As alternative or in addition to a visible display that is read by a camera, the example display device 560 may be a NFC tag and/or a Bluetooth device that allows the customer mobile device to read the "static" code 562 electronically from the display device 560. In any of these cases, the customer mobile device 532 is capable of sensing or otherwise generating the "static" code data from the "static" code displayed by the example display device 560.

Figure 15:
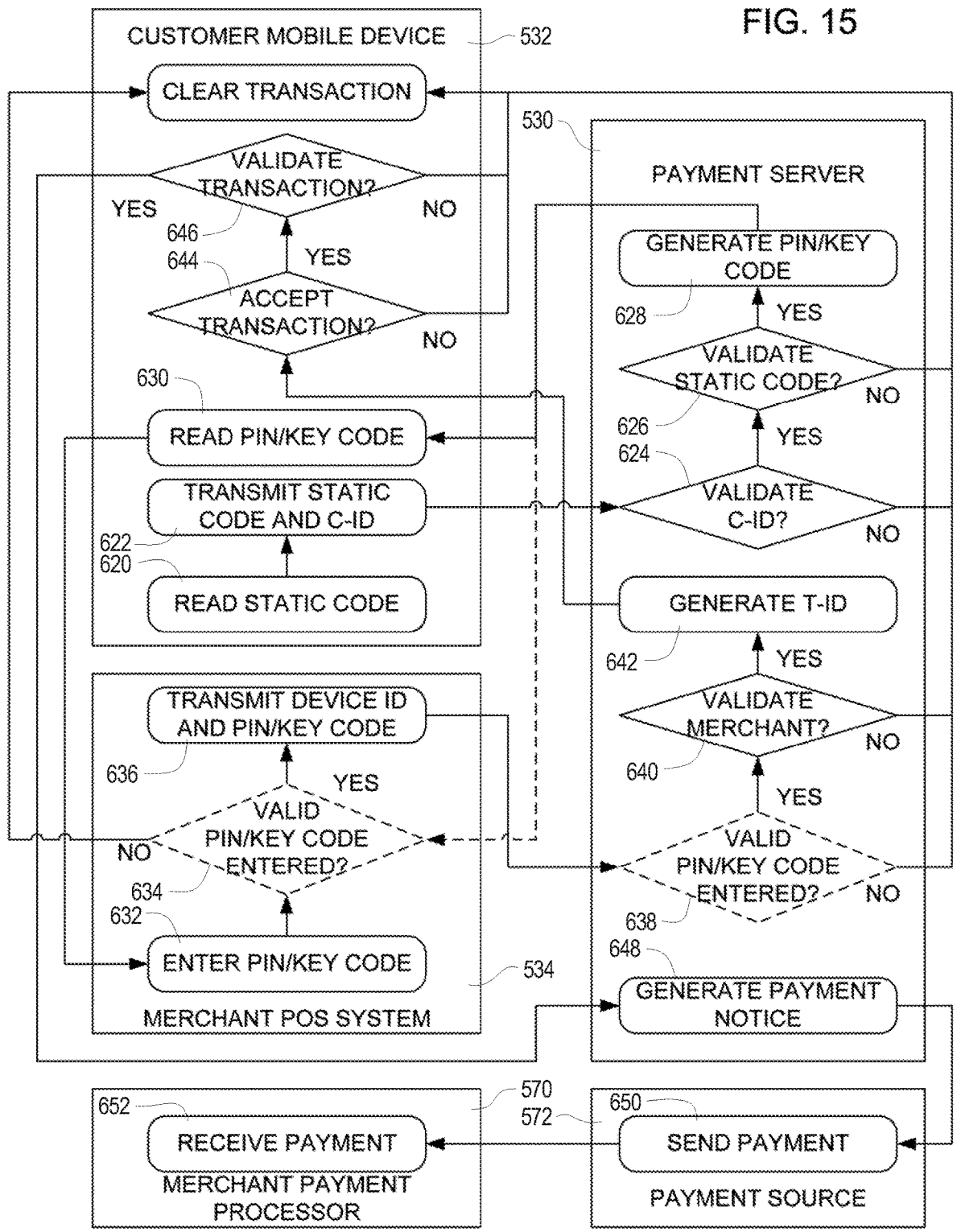
FIG. 15 is a flow chart illustrating the interactions among the components of the example electronic payment processing system of FIG. 13 when performing another example electronic payment processing method.

Turning now to FIG. 15 of the drawing, it can be seen that the principles of the present invention may be embodied as a method that employs the example payment processing system 520 to process payments from the customer to the merchant.

Initially, as shown at step 620, the customer uses the example customer mobile device 532 to read (e.g., take a photograph of, download) the "static" code 562 from the display device 560. In the primary example described above, the customer uses the iPhone to scan the static code from a sign or placard at the front of a gas pump island, grocery store lane, or ATM machine. The display device 560 will typically further comprise display markings that would identify the owner and/or location of the POS system 534.

At a step 622, the example customer mobile device 532 then transmits a transaction request comprising the static code data and a customer identification code (C-ID) unique to the customer or customer mobile device 532 to the payment server 530. In particular, the transaction request includes the data from the scan and data to identify the customer.

At a step 624, the payment server 530 next verifies that the C-ID is valid by comparing the specific C-ID received during the transaction with a database of valid C-ID's. At a step 626, the payment server validates the static code by comparing the static code with a database of valid static codes. Additional verification steps may be taken at step 626, such as comparing a location of the customer mobile device 532 as detected by GPS on the customer mobile device 532 with a known location of the merchant POS system 534. In this case, location data will also be transmitted from the customer mobile device 532 to the payment server 530 at the step 622.

After validating the C-ID (step 624) and the "static" code data (step 626), the payment server 530 initiates a new transaction at step 628 and returns a PIN/Key code number to the customer's device. The PIN/Key code number is unique, at least for that POS device 534 (e.g., POS owner and location. Optionally, the PIN/Key code number may also be transmitted to the merchant POS system 534 at step 628.

At step 630, the customer mobile device 532 displays the PIN/Key code number and the customer reads the PIN/Key code number. At step 632, the customer enters the PIN/Key code number into the merchant POS system 534 at the retail location. As one option, at a step 634 the merchant POS system 534 verifies that the PIN/Key code entered at the merchant POS system 534 and transmits the PIN/Key code and the device ID of the merchant POS system 534 to the payment server 530 at step 636. As another option, the merchant POS system 534 transmits the PIN/Key code and the device ID of the merchant POS system 534 to the payment server 530 at step 636, and the PIN/Key code is verified at the payment server 530 at a step 638.

At step 640, the payment server 530 validates the merchant, and the payment server 530 generates a transaction identification number (T-ID) at step 642. The customer may be given the option to accept the transaction at a step 644 and validate the transaction at a step 646, after which the payment server 530 generates a payment notice at step 648. The payment server 530 communicates the payment notice to the payment source 570 associated with the customer, and, at a step 650, the payment source 570 sends the payment to the merchant payment processor 572 associated with the merchant. The merchant payment processor 572 receives the payment at a step 652 and deposits the payment into the merchant's account.

As generally discussed above, the merchant POS system 534 may take the form of an ATM machine. In this case, the transaction flow would basically be same as other transactions described above, except that "purchase" may include the step of allowing the user to specify an amount of cash to be dispensed from the cash machine. In the context of an ATM machine, the processing systems and methods of the present invention may use the dynamic code or could be set up to use the "static" code and PIN configuration.

VII. First Example Two-Factor Verification System

Referring now to FIGS. 16A-D of the drawing, an example two-factor verification system or method constructed in accordance with, and embodying, the principles of the present invention will now be described.

A first example verification system of the present invention comprises a user interface 720 displayed on a user access device 722 as shown in FIG. 16. The example user access device 722 comprises a touch screen that allows entry of data and, optionally, graphical signature data as will be described in further detail below.

The example user interface 720 defines one or more user interface screens as depicted, as examples, by screenshots as depicted in FIGS. 16A, 16B, 16C, and 16D. The user device may be any computing device such as a smart phone, tablet computer, desktop computer, or the like to which the user has access. The device displaying the user interface 720 is the user access device 722.

A user desiring access to information has access to the user access device 722 and thus is capable of interfacing with applications or websites through which information may be accessed. Before the user is allowed access to certain restricted information, the user must perform a series of authentication steps. If the user successfully performs the series of authentication steps, the user is allowed access to a particular set of restricted user information. Typically, the user has a previously established account, and the set of user information to which the user is allowed access is associated with the account associated with the user.

Figure 16D:
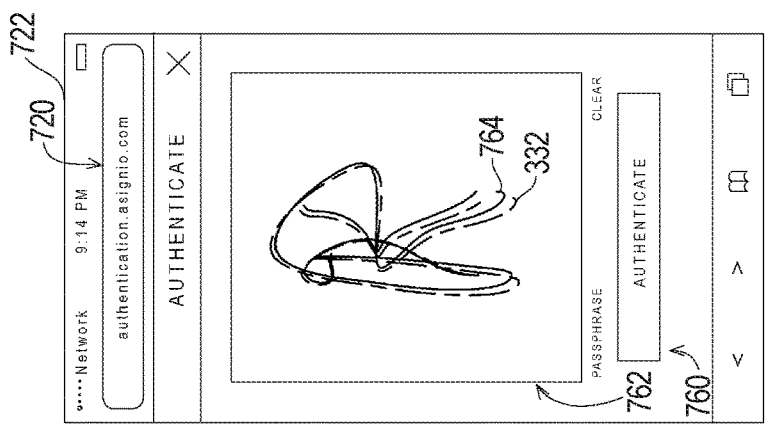
FIGS. 16A-D illustrate a user interface displaying screens for implementing a first example two-factor verification system of the present invention.
Figure 16C:
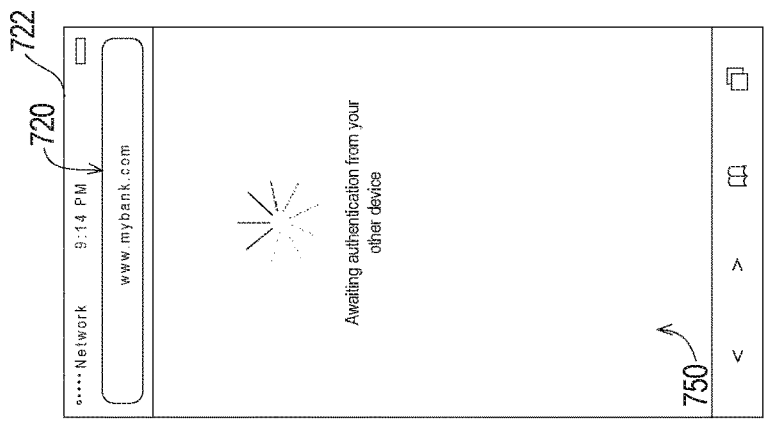
Figure 16B:
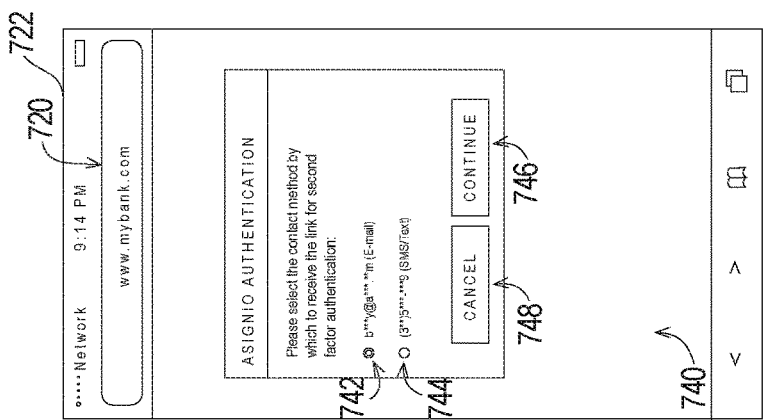
Figure 16A:
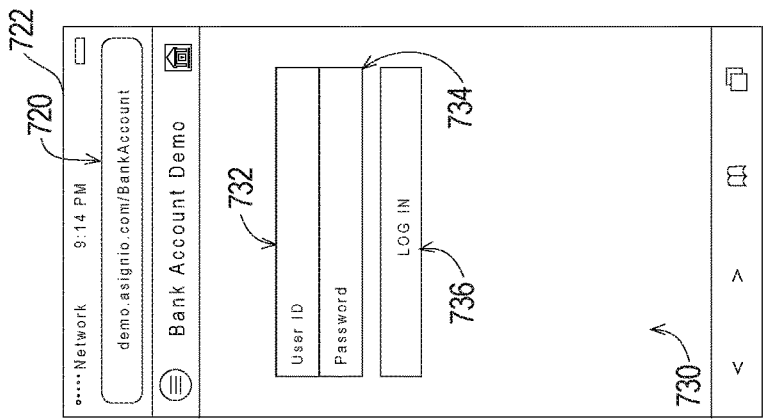

FIGS. 16A-16D of the drawing illustrate an example of the interaction between a user and the user interface 720 will initially be described. Initially, the user signs or logs in through a Log In screen 730 as shown in FIG. 16A by entering a user ID in a USER ID field 732 and a password in a PASSWORD field 734. The user then clicks on a LOG IN button 736.

If the user ID and password entered in fields 732 and 734 match a combination of user name and password of an existing user account, the user interface 720 proceeds to an Initiate Authentication screen 740 as shown in FIG. 16B. Based on the information stored in the existing user account, at least one contact method or "device" through which a second user authentication step may be performed is displayed on the Initiate Authentication screen 740. The term "device" may be used herein to represent any user device set up to access a contact method that the user has previously associated with the existing user account associated with the entered user name and password.

In the example Initiate Authentication screen 740, two contact methods are represented: an email address associated with a first radio button 742 and an SMS/Text address associated with a second radio button 744. The example email address and SMS/Text address are only partly displayed in a manner such that the entire addresses are not visible but would be recognizable to user associated with those addresses. The user selects the radio button 742 or 744 associated with one of the presented addresses and clicks on a CONTINUE button 746. The user may also click on a CANCEL button 748 to cancel the two-step verification process. In the example depicted in FIG. 16B, the user has clicked the email radio button 742 and clicks on the CONTINUE button 746. The user interface 720 next moves to a Wait screen 750 as shown in FIG. 16C at which the authentication of the user is paused until the two-step verification process is completed.

An authentication message is sent to the user using the contact method selected by the user at the Initiate Authentication screen 740. The user may receive the authentication message on any device accessible by the user. In the case of an authentication message sent by email, for example, the authentication message may be received on any computing device such as a smart phone, tablet computer, desktop computer, or the like set up to access the email account to which the authentication has been sent. The device on which the authentication message is received will be referred to as the user authentication device. The example user access device 722 comprises a touch screen that allows entry of data and graphical signature data as will be described in further detail below.

In the example depicted in FIG. 16D, the user authentication device on which the authentication message is received is the smartphone forming the user access device 722. In this case, the user simply switches between the app or browser displaying the user interface 720 to the messaging application on which the authentication message is received. In any event, clicking on the authentication message brings up a Complete Authentication screen 760 on the user authentication access device 722 as depicted in FIG. 16D.

The Complete Authentication screen 760 has a graphical data entry area 762 in which the handwritten session signature 764 is entered by interfacing with the touch screen with either a finger or a stylus. Upon entry of the handwritten session signature 764 and pressing of an AUTHENTICATE button 766, the handwritten session signature 764 is compared with the reference signature 332 established as described above. In particular, the handwritten session signature 764 is compared in software with the reference signature 332, and the handwritten session signature 764 will be verified only when it deviates by no more than a predetermined amount from the reference signature 332. The example reference signature 332 is depicted in FIG. 16D for the reader's reference only and would not be visible to the user at the time the handwritten session signature 764 is entered.

As can be seen in FIG. 16D, the handwritten session signature 764 substantially matches the reference signature 332 and would likely be verified. At that point, a message is sent to the partner server(s) storing the restricted user indicating that the authentication comparison was successful and that the user has been verified. The user interface 720 then proceeds to one or more additional user interface screens (not shown) that allow(s) access to the set of user information associated with the user name and password entered at the Log In screen 730.

VIII. Second Example Two-Factor Verification System

Figure 17A:
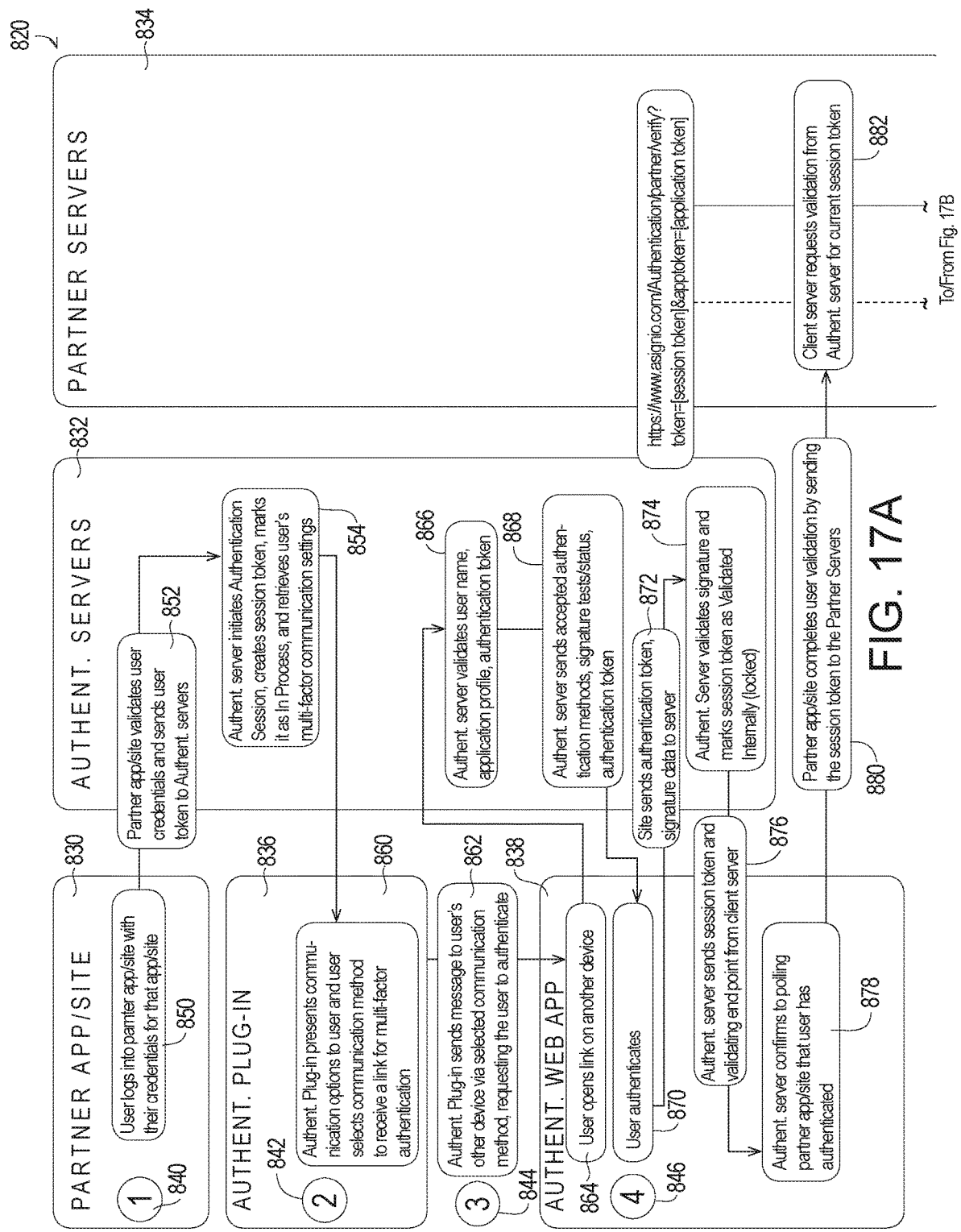
FIGS. 17A-B illustrate a system and method for implement a second example two-factor verification system of the present invention.
Figure 17B:
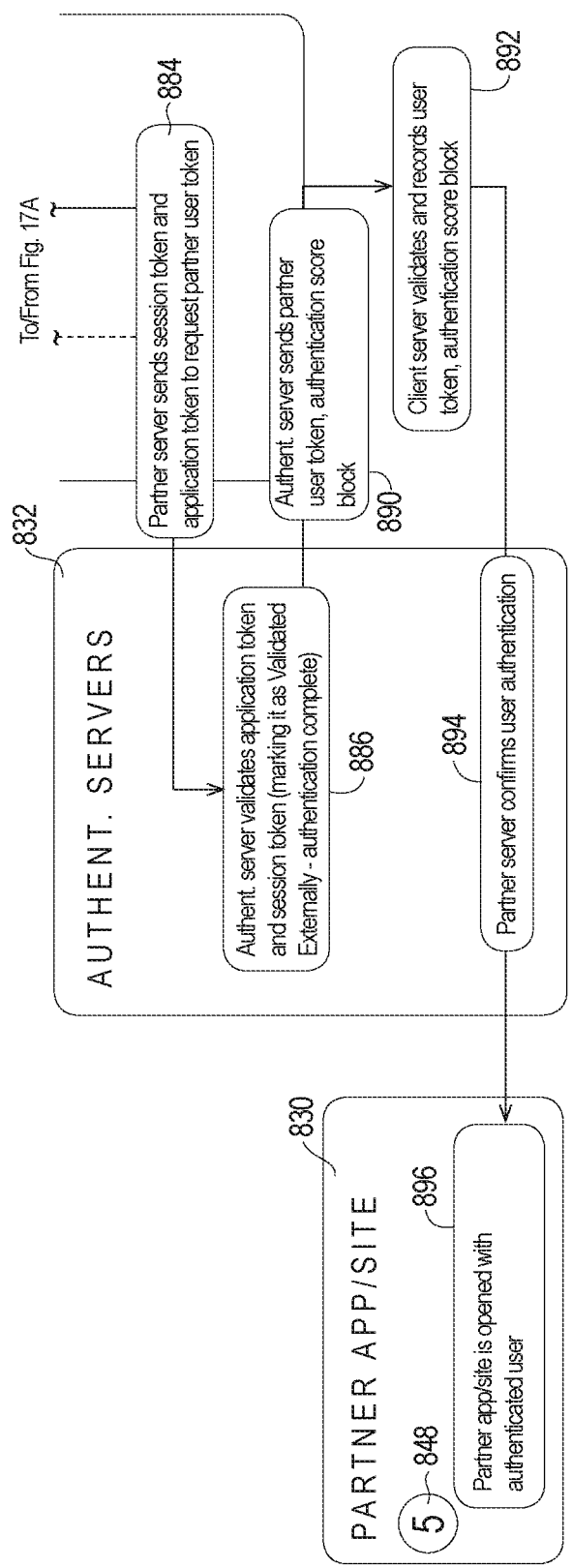

Referring now to FIGS. 17A and 17B of the drawing, a second example two-factor verification system or method constructed in accordance with, and embodying, the principles of the present invention will now be described.

FIGS. 17A and 17B illustrates that a second example verification system 820 of the present invention comprises a partner app/site 830, authentication server(s) 832, partner server(s) 834, an authentication plug-in 836, and an authentication web application 838. The partner app/site 830 represents a portal through which users access information stored on the partner server(s) 834 using, as examples, custom apps or industry standard browsers. The authentication server(s) 832 are typically embodied as computer servers that perform steps that verify whether a particular user is authorized to access a particular set of user information stored on the partner server(s) 834. The authentication plug-in 836 represents a plug-in configured to be accessed by the partner app/site 830. The authentication web application represents a portal through which users perform authentication steps using, as examples, a custom authentication application or industry standard browsers connected to the authentication server(s) 832.

The second example verification system 820 performs the following basic functions. The partner app/site 830 initiates a first function 840 that allows the user to log in and, if the log in is successful, starts the authentication plug-in 836. The authentication plug-in initiates a second function 842 that allows the user to select a communication method. After the communication method has been selected, a third function 844 is initiated in which an authentication message is sent to the user using the selected communication method. When the user receives the authentication message, a fourth function 846 is initiated in which the authentication process is completed by comparing a handwritten session signature entered by the user with a previously stored reference signature. After the handwritten session signature has been validated, a fifth function 848 is initiated in which the authenticated user is allowed access to the set of user information stored on the partner server(s) 834.

With the foregoing general understanding of the operation of the example verification system 820 in mind, the details of the second example verification system 820 will now be described.

The first function 840 is initiated at a step 850 in which the user logs into the partner app/site 830 using credentials such as user ID and password. An example of a user interface screen that may be presented to the user at the step 850 is depicted in FIG. 16A.

At a step 852, the partner app/site 830 validates the user credentials and sends a user token to the authentication server(s) 832. The term "user credentials" will be used herein to refer to information that identifies a user to allow access to a given secure resource by that user. Examples of user credentials include Username, User ID, and Password.

The authentication server(s) 832 initiates an authentication session at a step 854. The term "authentication session" refers to A time-based record that maintains the status of a given user's authentication and tracks data associated with the user, the resource being authenticated, authentication methods/attempts, and the success/failure of those attempts. When an authentication session is completed, it can no longer be referenced to authenticate a resource, and a new authentication session must be started.

To initiate the authentication session, authentication server(s) 832 create a session token. The term "session token" as used herein refers to a unique value or key used to identify an authentication session. After the session token is created, the session token is marked as "In Process" to indicate that the authentication session is still active. The authentication server(s) 832 then retrieve multi-factor communications settings previously stored by the user. Communications settings refer to communications methods by which users may be contacted, and examples of communications methods forming the communications settings include email addresses, SMS/Text phone numbers, and the like. After the multi-factor communications settings are retrieved, the authentication server(s) 832 sends to the authentication plug-in 836 the previously communications methods stored as part of the multi-factor communications settings.

At a step 860, the example authentication plug-in 836 displays the communications options to the user. An example of a user interface screen that may be presented to the user at the step 860 is depicted in FIG. 16B. The user selects a desired communications option, and, at step 862, the authentication plug-in sends an authentication message to the user using the selected communication method. The authentication message requests that the user complete the authentication process on the user device on which the authentication message is received. At this point, the example authentication plug-in 836 displays a wait screen to the user. An example of a wait screen that may be presented to the user is depicted in FIG. 16C.

In response to the authentication message, at step 864 the authentication application 838 is opened on the user device on which the authentication message is received, and a link is presented to the user. In particular, when a user decides to use an additional device or system to authenticate a resource, the device being used to request access to that resource sends a link (typically a URL) to the additional device or system. The use of the link to a separate resource constitutes multi-factor authentication because multiple factors (e.g., devices or systems) are required to complete the authentication session. The link is used to connect the two devices so the additional device is authenticating the request from the original device. Example: If a user desires to sign into a web site on their laptop, and wants to use a session signature to authenticate, a link for Multi-factor Authentication is generated and sent to a touch-enabled device capable of allowing the user to enter a session signature for comparison to the user's previously established reference signature.

When the link is opened at step 864, the authentication application 838 sends the user name, the application profile of the authentication application 838, and the authentication token to the authentication server(s) 832. The authentication server 832 validates the user name, application profile, and authentication token at step 864. After the authentication server 832 validates the user name, application profile, and authentication token at step 866, the authentication server 832 sends the accepted authentication methods, signature tests/status, and authentication token to the authentication application 838 at step 868.

The term "application profile" is used herein to refer to a profile record that connects a user's authentication account to a verified partner application account. For example, when a user signs into a partner resource, and verifies, based on the partner resource's conditions, that the user's partner account is valid, the authentication system creates an application profile. The application profile serves as a verified connection between the authentication account and the partner application's user account.

The term "authentication token" refers to a unique value (or key) that identifies an authentication session. For example, an authentication token may be a GUID (Guaranteed Unique Identifier), automatically generated by a server, that consists of a series of hexadecimal numbers/letters. An authentication token either has a GUID value or is empty (null) and has no value. Only authentication tokens with a GUID value are valid.

The term "signature tests/status" as used herein refers to the results of a series of test performed by the authentication system on submitted data associated with a session signature. For example, whenever a user submits a session signature for validation (i.e., to see if the submitted session signature matches the original, master reference signature), the authentication sever(s) 832 run a series of tests (i.e., signature tests) on the submitted data. The results of these tests determines if the signature "passed" (i.e., matched) or "failed" (i.e., did not sufficiently match). If the user's submitted signature did not match their original, master reference signature, then the status of the signature tests is failed, and the authentication is rejected. The result of a failed signature test is similar to the result that occurs when a user enters an incorrect password.

The user enters a handwritten session signature to authenticate at step 870. An example of a user interface screen that may be presented to the user at the step 866 is depicted in FIG. 16D. The authentication web application 838 next sends the authentication token and signature data to the authentication server at step 872.

At step 874, the authentication server 832 validates the handwritten session signature entered at step 866 and by comparing the signature data with reference data associated with a previously created reference signature. The reference signature may be created in the same manner as the example reference signature 332 described above. As generally discussed above, the handwritten session signature will be verified only when the signature data deviates from the reference data by no more than a predetermined amount.

After the handwritten signature data has been validated at step 874, the session token is marked as "Validated Internally" (locked). At a step 876, the authentication server 832 sends the session token and a validating end point obtained from the partner server 836 to the authentication web application 838. The term "validating end point" refers to the partner server's URL that the Asignio servers call to return validation information. In particular, after the Asignio servers verify that the user has successfully authenticated via their chosen method (e.g., signature), the partner server's URL is identified as the validating end point is, and the authentication server(s) 832 call that URL to return the validation information. This validating end point would, presumably, process the information from the authentication server(s) 832 and deliver (or not deliver) the originally requested secure resource that the verification system 820 was used to authenticate. If a user is signing into a partner web site using the verification system 820, and the user has successfully authenticated using as described herein, the authentication server(s) then call the validating end point with that information. The user is then redirected, by that validating end point on the partner server, to the secure resource to which they requested access.

Accordingly, the authentication sever confirms to the polling partner app/site 830 at a step 878 that the user has been authenticated. At a step 880, the partner app/site 830 completes the user validation process by sending the session token to the partner server(s) 836. At a step 882, the partner server(s) 836 requests validation from the authentication server(s) 832 for the current session token.

At a step 884, the partner server(s) 834 sends the session token and application token to request a partner user token. The term "application token" refers to a unique value (key) that is used to identify a partner application. An application token is provided by the administrators of the authentication server(s) 832 to administrators of the partner server(s) 834 to identify the applications they have that are authenticated using the authentication server(s) 832. Every time a partner system communicates with the authentication server(s) 832, the application token is sent and verified by the authentication server(s) 832 as valid to secure the communication. For example, an application token may be a GUID (Guaranteed Unique Identifier), automatically generated by a server, that consists of a series of hexadecimal numbers/letters. An application token either has a GUID value or is empty (null) and has no value. Only application tokens with a GUID value are valid. The authentication server(s) validate the application token and session token at step 886, marking the session token as "Validated Externally". At this point, the authentication process is complete.

At a step 890, the authentication server(s) 832 sends a partner user token and authentication score block to the partner server(s) 834. The term "authentication score block" is used herein to refer to a score block that represents the confidence level that the user associated with a session signature is a user associated with a stored reference signature. In particular, when a user authenticates via the authentication server(s) 832 (e.g., with a session signature), the authentication server(s) generates a score block that represents the confidence level Asignio has that the user is, in fact, who they say they are. The partner servers then use that score block and make the decision whether or not to allow access to the requested secure resource. For example, if a user uses their signature to authenticate a partner resource, the authentication server takes into consideration factors such as the scores of the signature matching tests and the GPS position of their action based on previous authentication attempts and generates a score block. If the user has signed into the same resource repeatedly and failed repeatedly, and then finally gets in, the score block would be lower than if the user's signature passed consistently and immediately. Or if the user signed in from a location different from the user's location during previous authentication attempts, the score block would be lower than if the user signed in from a location that is the same as from the user's location during previous successful authentication attempts.

The partner server(s) 834 validates and records the user token and authentication score block at step 892. After the partner server(s) 834 validates the user token and authentication score block at a step 892, the partner server(s) 834 sends confirmation of user authentication to the partner app/website at step 894. At a step 896, the partner app/site 830 is opened to allow the authenticated user appropriate access to the partner app/site 830.

What is claimed is:

1. A verification system for verifying a session user for use with a partner server for storing user information associated with the plurality of users and a partner app/site forming a portal to the user information stored on the partner server, where the partner app/site allows the plurality of users to enter session user credentials, the verification system comprising:

an authentication server that stores
    stored user credentials associated with each of a plurality of users, and
    a reference signature associated with each of the plurality of users, where each reference signature represents a plurality of handwritten calibration signatures entered, using at least one touch sensitive screen, by the user associated each reference signature;

an authentication plug-in running on a first computing system that
    presents communications options to the plurality of users, and
    allows the plurality of users to identify at least one selected communications option; and an authentication application running on a second computing system that allows the plurality of users to enter a handwritten session signature; wherein the authentication server compares session user credentials entered using the partner app/site with the stored user credentials to validate the session user credentials;

if the session user credentials are validated, the authentication plug-in presents to the session user at least one communications method associated with the session user, allows the session user to identify a selected communications method from the at least one communications method presented to the session user, and sends an authentication message to the session user using the selected communications method;

the authentication application allows the session user to enter a handwritten session signature in response to the authentication message, and sends the handwritten session signature to the authentication server;

the authentication server compares the handwritten session signature entered by the session user with the reference signature associated with the session user to validate the handwritten session signature entered by the session user, and if the handwritten session signature entered by the session user is validated, generates an authentication score block containing scores of signature matching tests and additional factors associated with authentication of the handwritten session signature, where the additional factors associated with authentication of the handwritten signature include at least one of location and number of authentication attempts;

sends the authentication score block to the partner server; and using at least one of the scores of the signature matching tests and the additional factors of the authentication score block, the partner app/site makes a decision whether to allow the session user to access a set of user information that is associated with the session user and stored on the partner server.

2. The verification system as recited in claim 1, in which the authentication server:

creates a session token if the session user credentials are validated;

marks the session token as "in progress"; and sends the session token to the authentication plugin with the at least one communications method associated with the session user.

3. The verification system as recited in claim 2, in which:

the authentication application sends the session token to the authentication server after the authentication message has been received by the session user; and the authentication server marks the session token as "validated internally" if the handwritten signature entered by the session user is validated.

4. The verification system as recited in claim 3, in which:

the partner app/site sends the session token to the partner server if the handwritten signature has been validated;

the partner server requests validation of the session token from the authentication server; and the authentication server marks the session token as "validated externally".

5. A method of verifying a session user comprising the steps of:

storing stored user credentials associated with each of a plurality of users, storing a reference signature associated with each of the plurality of users, where each reference signature represents a plurality of handwritten calibration signatures entered, using at least one touch sensitive screen, by the user associated each reference signature;

storing user information associated with the plurality of users;

providing a portal to the user information stored on the partner server, where the portal allows the plurality of users to enter session user credentials;

allowing the session user to enter session user credentials;

comparing the session user credentials with the stored user credentials to validate the session user credentials;

if the session user credentials are validated, presenting to the session user on a first computing system at least one communications method associated with the session user, allowing the session user to identify a selected communications method from the at least one communications method presented to the session user, and sending an authentication message to the session user using the selected communications method;

in response to receipt by the session user of the authentication message, allowing the session user to enter a handwritten session signature on a second computing system in response to the authentication message;

comparing the handwritten session signature entered by the session user with the reference signature associated with the session user to validate the handwritten session signature entered by the session user;

generating an authentication score block containing scores of signature matching tests and additional factors associated with authentication of the handwritten session signature where the additional factors associated with authentication of the handwritten signature include at least one of location and number of authentication attempts; and using at least one of the scores of the signature matching tests and the additional factors of the authentication score block, making a decision whether to allow the session user to access a set of user information that is associated with the session user and stored on the partner server.

6. The method as recited in claim 5, in which further comprising the steps of:

creating a session token if the session user credentials are validated;

marking the session token as "in progress"; and sending the session token to the authentication plugin with the at least one communications method associated with the session user.

7. The method as recited in claim 6, further comprising the steps of:

sending the session token to the authentication server after the authentication message has been received by the session user; and marking the session token as "validated internally" if the handwritten signature entered by the session user is validated.

8. The method as recited in claim 7, further comprising the steps of:
sending the session token if the handwritten signature has been validated;
requesting validation of the session token; and marking the session token as "validated externally".

* * * * *